US012632908B2

(12) United States Patent
Mujumdar et al.

(10) Patent No.: US 12,632,908 B2
(45) Date of Patent: May 19, 2026

(54) UNIFIED DYNAMIC CONTROLLER FOR POWER AND PROCESS APPLICATIONS

(71) Applicant: Schneider Electric Systems USA, Inc., Foxborough, MA (US)

(72) Inventors: Subodh Mujumdar, Hyderabad (IN); Christopher J. Smith, Hornsby (AU); Shahid Ansari, Hyderabad (IN); Krishnamohan Botsa, Hyderabad (IN); Suresh Kumar Reddy Singam, Hyderabad (IN); Sravan Alle, Hyderabad (IN)

(73) Assignee: SCHNEIDER ELECTRIC SYSTEMS USA, INC., Foxborough, MA (US)

( * ) Notice: Subject to any disclaimer, the term of this patent is extended or adjusted under 35 U.S.C. 154(b) by 555 days.

(21) Appl. No.: 18/124,852

(22) Filed: Mar. 22, 2023

(65) Prior Publication Data

US 2024/0249372 A1 Jul. 25, 2024

(30) Foreign Application Priority Data

Jan. 23, 2023 (IN) .............................. 202311004455

(51) Int. Cl.
*G06Q 50/06* (2024.01)
*H04L 67/12* (2022.01)
(52) U.S. Cl.
CPC ............. *G06Q 50/06* (2013.01); *H04L 67/12* (2013.01)
(58) Field of Classification Search
CPC .................................. G06Q 50/06; H04L 67/12
See application file for complete search history.

(56) References Cited

U.S. PATENT DOCUMENTS 10,178,177 B2    1/2019  McLaughlin et al.
10,735,478 B2 *  8/2020  Albrecht ............. H04L 61/4511
(Continued)

FOREIGN PATENT DOCUMENTS

CN      117806248 A    4/2024
EP      2283403 B1     8/2015
(Continued)

OTHER PUBLICATIONS

J. Vasel "Power up your plant—An introduction to integrated process and power automation" Conference: 21st World Energy Congress (WEC) 2010, Sep. 15, 2010 (Year: 2010).*
(Continued)

*Primary Examiner* — David R Lazaro
(74) *Attorney, Agent, or Firm* — Stinson LLP

(57)    ABSTRACT

A high availability controller for combining and unifying aspects of a process controller and an electrical controller. A unified namespace combines a process domain namespace and a power domain namespace in a common database of the controller without altering either. The unified namespace maps source device names of the power domain and unique process control names of the process domain. A common record set of sequence of events (SOEs) for the process domain and the power domain is generated and SOEs arising from the power domain are incorporated into the common record set. The controller performs process control and monitoring along with electrical control signaling and monitoring within a single control strategy directly from the controller.

19 Claims, 20 Drawing Sheets

(56) References Cited

U.S. PATENT DOCUMENTS

| | | | |
|---|---|---|---|
| 10,935,946 B2 | 3/2021 | Day et al. | |
| 11,294,843 B2 | 4/2022 | McLaughlin et al. | |
| 2002/0046246 A1* | 4/2002 | Wright | H04L 51/18 |
| | | | 709/206 |
| 2009/0070447 A1* | 3/2009 | Jubinville | H04L 67/025 |
| | | | 709/226 |
| 2013/0096695 A1 | 4/2013 | Meyer | |
| 2017/0115645 A1* | 4/2017 | Merritt | G05B 19/4185 |
| 2021/0342122 A1* | 11/2021 | Lee | G06F 8/10 |
| 2021/0389739 A1* | 12/2021 | Nadumane | G05B 15/02 |
| 2022/0303253 A1* | 9/2022 | Gordon | H04L 63/0428 |
| 2023/0267016 A1 | 8/2023 | Mujumdar et al. | |
| 2024/0249372 A1* | 7/2024 | Mujumdar | H04L 67/12 |
| 2025/0013223 A1* | 1/2025 | Mujumdar | G06Q 50/06 |

FOREIGN PATENT DOCUMENTS

| KR | 1020160098522 A | 8/2016 |
|---|---|---|
| WO | 2008155596 A1 | 12/2008 |

OTHER PUBLICATIONS

Communication pursuant to Article 94(3) EPC from EP Application No. 24151838.0, dated Jul. 24, 2025, 6 pages.

Extended European Search Report from EP Application No. 24151838.0, dated Jun. 17, 2024, 10 pages.

Extended European Search Report from EP Application No. 25165117.0, dates Sep. 24, 2025, 5 pages.

* cited by examiner

```
Report Filtering Algorithm:
isReportOK ()
{
    if (Object is timestampable)
        if (((timeStampNew > timeStampOld) &&
            (((qualityNew == unknown) &&
             (qualityOld == unknown)) ||
             (qualityNew != unknown)))
            return true;
        else
            return false;
    else
        if (server is active)
            return true;
        else
            return false;
}
```

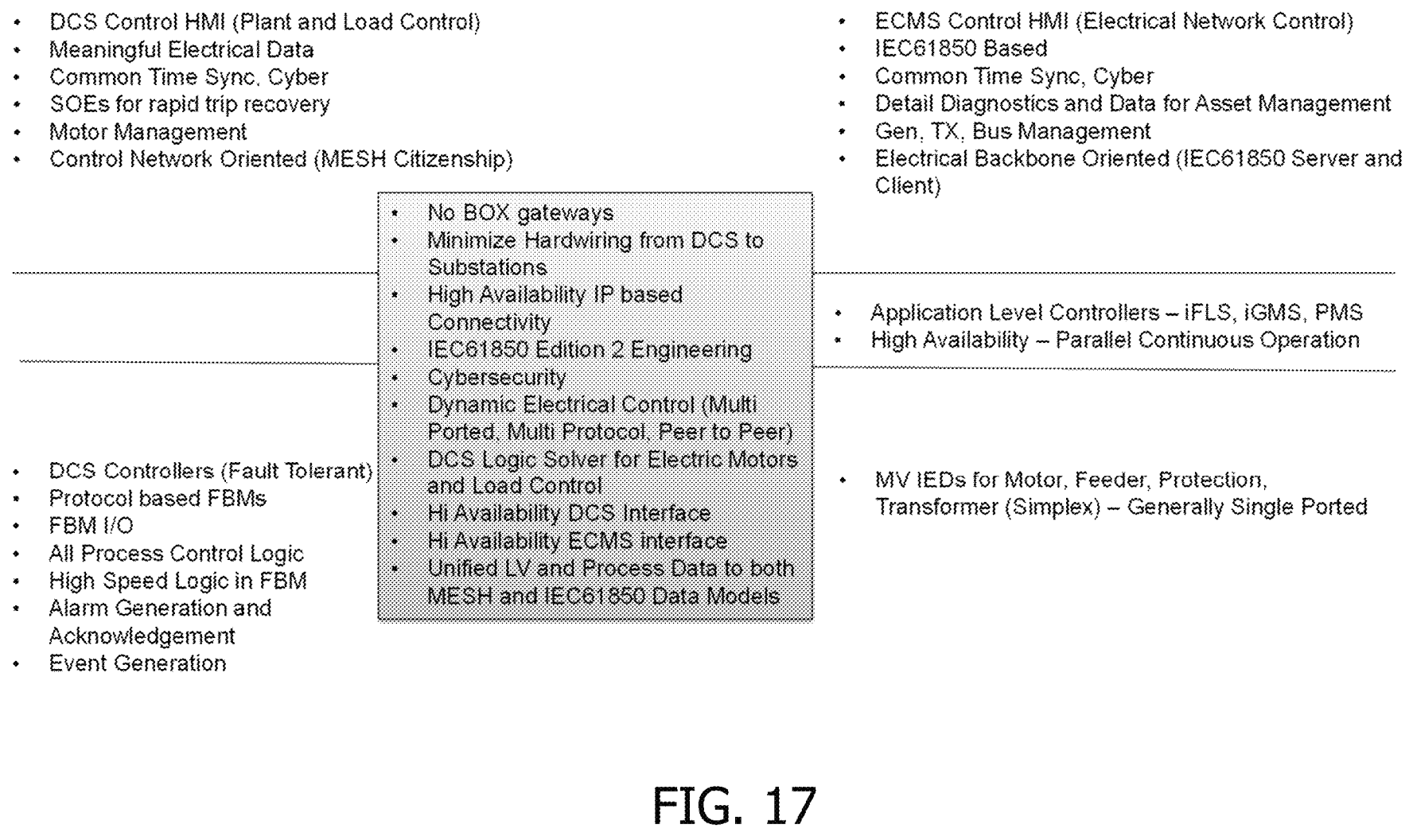

- ECMS Control HMI (Electrical Network Control)
- IEC61850 Based
- Common Time Sync, Cyber
- Detail Diagnostics and Data for Asset Management
- Gen, TX, Bus Management
- Electrical Backbone Oriented (IEC61850 Server and Client)

- Application Level Controllers – iFLS, iGMS, PMS
- High Availability – Parallel Continuous Operation

- MV IEDs for Motor, Feeder, Protection, Transformer (Simplex) – Generally Single Ported

- No BOX gateways
- Minimize Hardwiring from DCS to Substations
- High Availability IP based Connectivity
- IEC61850 Edition 2 Engineering
- Cybersecurity
- Dynamic Electrical Control (Multi Ported Multi Protocol Peer to Peer)
- DCS Logic Solver for Electric Motors and Load Control
- Hi Availability DCS Interface
- Hi Availability ECMS interface
- Unified LV and Process Data to both
- MESH and IEC61850 Data Models

- DCS Control HMI (Plant and Load Control)
- Meaningful Electrical Data
- Common Time Sync, Cyber
- SOEs for rapid trip recovery
- Motor Management
- Control Network Oriented (MESH Citizenship)

- DCS Controllers (Fault Tolerant)
- Protocol based FBMs
- FBM I/O
- All Process Control Logic
- High Speed Logic in FBM
- Alarm Generation and Acknowledgement
- Event Generation

FIG. 17

UNIFIED DYNAMIC CONTROLLER FOR POWER AND PROCESS APPLICATIONS

CROSS-REFERENCE TO RELATED APPLICATION

This application claims priority from Indian Provisional Patent Application No. 202311004455, filed Jan. 23, 2023, the entire disclosure of which is incorporated herein by reference.

BACKGROUND

Combining process and electrical control schemes requires direct parallel hardwiring and interlocks or the use of gateways and intersystem cabling and marshalling cubicles that convert the relevant namespaces to a commonly understood client server protocol (e.g., Modbus Serial). In addition, conventional combined controllers can experience excessive control latency and round trip time.

SUMMARY

Aspects of the present disclosure provide a high availability controller that combines and unifies aspects of a process controller and an electrical controller. The combinational aspect is related to the inclusion of a process control namespace as well as a namespace defined by a communication protocol such as IEC 61850 for intelligent electronic devices (IEDs). In an aspect, both namespaces are included within the same database of the embedded controller without alteration and provide unaltered behavior of both. Aspects of the present disclosure support multiple logical engines working asynchronously on a common database and combine cyclic process controls with event driven electrical signaling behavior required by IEC 61850.

The main protocols involved include, for example, the Foxboro Compound.Block.Parameter namespace with Object Manager Services, IEC 61850 Server and Client, and Modbus TCP Server and Client on common Ethernet controllers. The controller of the present disclosure is completely self-contained and continues to run and preserve data and events available until reconnected to multiple clients and servers individually.

In an aspect, a method of configuring a controller for use in both a process domain and a power domain of an industrial operation includes mapping a unified namespace to source device names of one or more IEDs in the power domain. The unified namespace is based on unique process control names of the process domain. The method further comprises generating a common record set of sequence of events (SOEs) for the process domain and the power domain and incorporating the SOEs arising from the IEDs in the common record set. The controller performs process control and monitoring along with electrical control signaling and monitoring within a single control strategy directly from the controller.

In another aspect, an electrodynamic controller has a high availability architecture for control in both a process domain and in an electrical domain of an industrial operation. The controller comprises a database, a processor, and a memory device. The database stores a unified namespace that maps source device names of devices in the power domain based on unique process control names of the process domain. The memory device stores processor-executable instructions that, when executed, configure the processor for performing both process control and monitoring and electrical control signaling and monitoring within a single control strategy directly therefrom.

Other objects and features of the present disclosure will be in part apparent and in part pointed out herein.

BRIEF DESCRIPTION OF THE DRAWINGS

FIG. 17 illustrates components of the integrated process and electrical domains according to an embodiment.

Corresponding reference numbers indicate corresponding parts throughout the drawings.

DETAILED DESCRIPTION

Combining process and electrical control schemes has in the past required either direct parallel hardwiring and interlocks or the use of gateways and intersystem cabling and marshalling cubicles. With the use of higher speed control hardware, memory and Ethernet capability, a single controller embodying aspects of the present disclosure can now remove the need for gateways and proxy control connections and protocol converters thus providing a lower cost, simpler solution. In addition, the disclosed controller allows for a single process control strategy to directly interact with the electrical high speed control services within the same execution engine thus greatly reducing control latency and round trip time.

Figure 1:
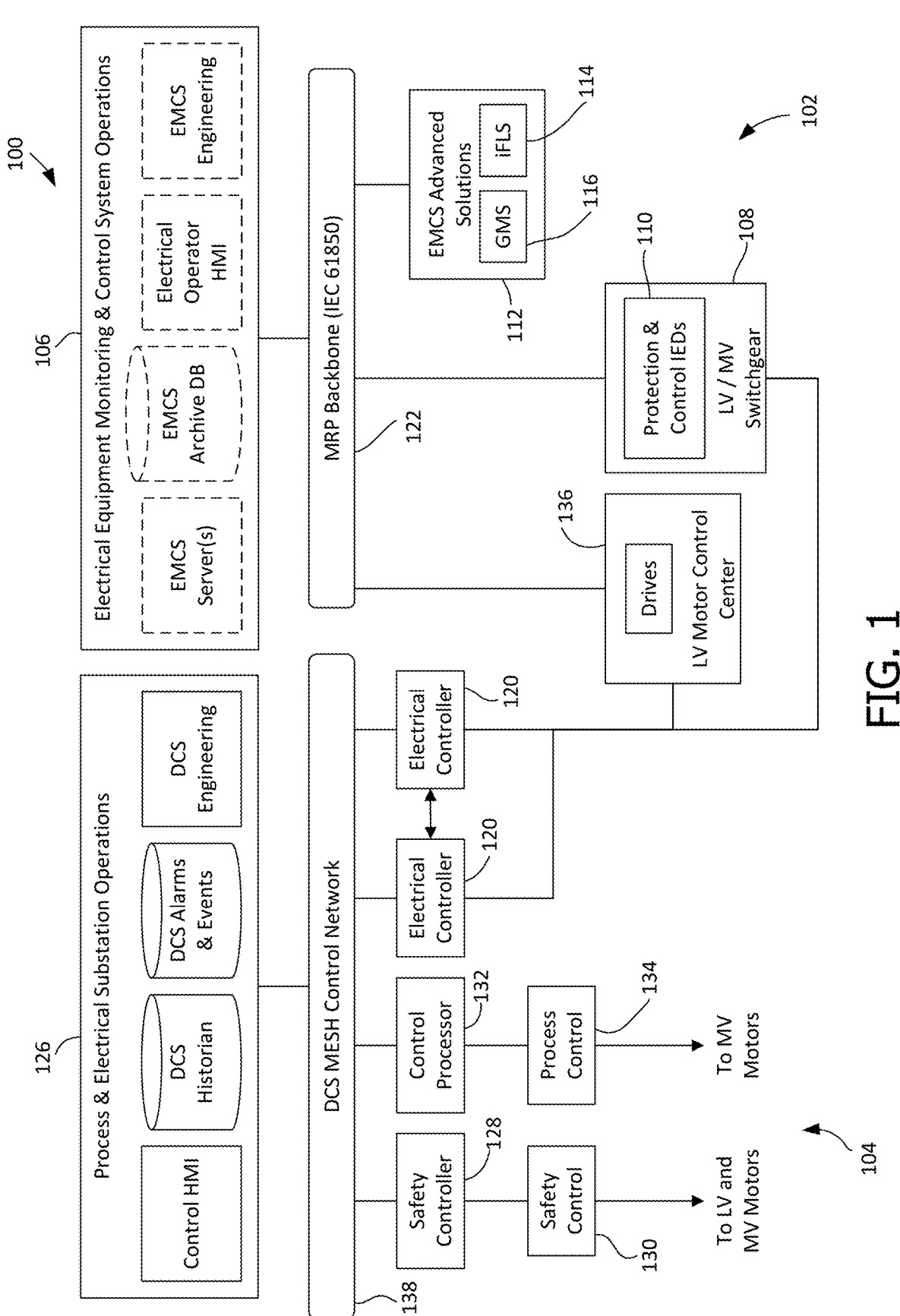
FIG. 1 illustrates an electrical and process system having a high availability unified architecture according to an embodiment.

Referring to FIG. 1, an example process and power system 100 is shown. In the illustrated embodiment, the system 100 integrates an electrical system 102 and a process system 104, which together make up an electrical substation. The electrical system 102 comprises electrical equipment monitoring and control system (EMCS) operations indicated at 106. The EMCS operations 106 include, for instance, at least one human-machine interface (HMI) and at least one database containing archived EMCS data for automating electrical substation control, maintaining stable generating conditions, and the like. The electrical system 102 of FIG. 1 also includes low voltage (LV) and/or medium voltage (MV) switchgear 108 (housing protection and control IEDs 110) and EMCS solutions 112 (including, for example, intelligent Fast Load Shed (iFLS) protection 114 and a Generation Management System (GMS) 116). In an embodiment, one or more unified electro-dynamic controllers 120 combine and unify aspects of both a process controller for process control and an electrical controller for electrical control. The controllers 120 provide functionality for data acquisition, display, history collection, alarming, reporting, etc. for electrical system 102. The controller 120 is configured for obtaining data from the various LV and MV devices. As familiar to those skilled in the art, communications within electrical system 102 are in accordance with an IEC 61850 network, indicated at 122. IEC 61850 defines a standard for the design of electrical substation automation systems and applications, including a communication protocol. In this regard, each Intelligent Electronic Device, such as each IED 110, is a logical node on the IEC 61850 network 122 representing a functional capability of the device. Moreover, the controller 120 of electrical system 102 is a logical node on IEC 61850 network 122.

The process system 104 of FIG. 1 comprises process and electrical substation operations indicated at 126. The operations 126 include, for instance, at least one HMI, at least one database containing alarms and events, at least one historian, and the like. The process system 104 also includes at least one safety controller 128 connected to one or more safety control devices 130 and at least one processor controller 132 connected to one or more process control devices 134. Further to the example of FIG. 1, the one or more unified controllers 120 also provide functionality for data acquisition, display, history collection, alarming, reporting, etc. with respect to a low voltage motor control center (MCC) 136 or the like for process system 104. As familiar to those skilled in the art, the components of process system 104 are coupled in accordance with a DCS MESH network, indicated at 138. In this embodiment, controller 120 of process system 104 is a node on MESH network 138 and maintains the high availability requirements of the DCS.

As described above, creating a high availability scheme for a controller typically requires dedicated hardware interfaces and is platform-specific and application-specific. The controller 120, however, is capable of satisfying the high availability requirements of the DCS as well as capable of bringing the data from electrical system 102 to process system 104. In this regard, aspects of the present disclosure integrate the high availability schemes of both DCS (process system 104) and EMCS (electrical system 102). By combining these high availability schemes, a high degree of availability is achieved by the unified controller 120. The controller 120 can receive data from the various LV and MV devices supporting the open standard communication protocols and serve the data to the DCS using its proprietary communication protocols.

According to an embodiment, a unified namespace combines a process domain namespace and a power domain namespace in a common database of controller 120 without altering either. The unified namespace maps source device names of the power domain (i.e., electrical system 102) and unique process control names of the process domain (i.e., process system 104). A common record set of SOEs for the process domain and the power domain is generated and SOEs arising from the power domain are incorporated into the common record set. The controller 120 performs process control and monitoring along with electrical control signaling and monitoring within a single control strategy directly from the controller. The use of a common database with cloning allows for the lossless transmission of SOEs without loss and time-tagged at source. The controller 120, also referred to as the Electro Dynamic controller, is completely bi-directional and is the first to support dual-ported control and electrical network backbones, while maintaining their segregation. This simplifies the cybersecurity model as well as ensures that instrumentation from either process instruments or electrical drives or IEDs can be combined within the same distributed control strategy. This greatly enhances the ability of process engineers to combine electrical equipment within a process control automation loop, and continually refine that loop throughout the lifecycle of the site without necessitating additional or changed hardwiring.

In an embodiment, the hardware of controller 120 is based on electrical standards for operation in difficult electromagnetic compatibility environments encountered in substations. For this reason, controller 120 can be placed directly in an electrical cubicle and extend the control network via fiber optic connections back to the field instrument room, for instance, at any distance. This provides an added benefit of simplicity and reduced control hardware complexity. Since the controller dual ports the DCS control network and IEC 61850 client and server, controller 120 can be locally distributed and a single controller acts as the main publisher on the control network.

Figure 20:
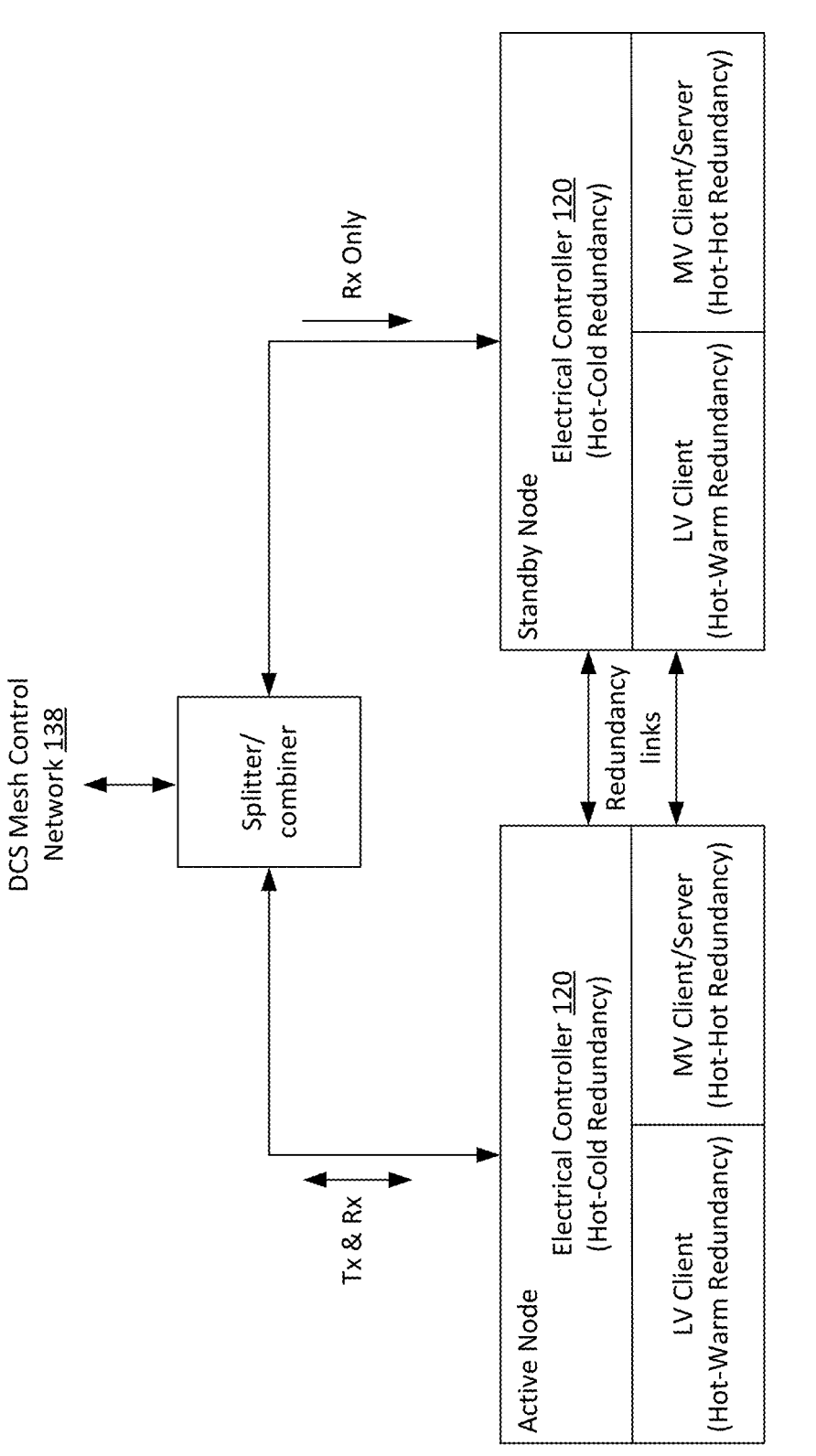
FIG. 20 is a block diagram illustrating an interface design for a DCS control network of FIG. 1 according to an embodiment.

The electrical controller 120 is connected to the DCS mesh controller network 138 using, for example, fiber optic Ethernet connections. For this purpose, Small Form-factor Pluggable (SFP) interfaces with Digital Diagnostic Monitoring (DDM) are used. Using the DDM feature, the transmit feature of the SFP is controlled from firmware through an I2C interface. Under normal conditions, if the SFP is directly connected to any network, disabling the transmit feature would make the LINK DOWN on the Ethernet interface. In the DCS control network (i.e., the mesh network 138) interface design of electrical controller 120 (see FIG. 20), the optical fiber SFPs of electrical controllers 120 are connected to DCS mesh network 138 through an external splitter/combiner. In this architecture of FIG. 20, the transmit feature is enabled on the Active controller and is disabled on the Standby controller. Even though the transmit feature is disabled on Standby electrical controller, Ethernet LINK is UP because of the DCS control network (or the mesh) interface design, thus enabling parallel reception of data on both controllers 120 from the mesh network 138 and transmission of data only from the Active controller to the mesh network 138.

Aspects of the present disclosure provide a unified namespace based on unique process control names, mapped to source IED names based on the IEC 61850 namespace. In an embodiment, the unified namespaces uses DCS function_block.parameter automation across the process and electric power domains and incorporates all SOEs arising from IEC 61850 connected IEDs within the common process, safety, and power SOE record set. Aspects of the present disclosure also incorporate SOE buffers to allow for pending events to be published with source time tag without disturbance or constraint on the control processor cycle. For these reasons, controller 120 embodying aspects of the present disclosure enables multiple dissimilar protocols to be managed both in client and server form within the same DCS controller, enables asynchronous response to protocol requests (polled, buffered, and unbuffered) for connection-based protocols within the same controller, and enables support of time synchronization of downstream IEDs via either a Precision Time Protocol (PTP) or a Simple Network Time Protocol (SNTP).

The unified namespace is required to allow simple data types to represent data from both external electrical control system 102 and process control system 104. More than just a namespace, the read-write characteristics allow for cloning and buffering of events, which support asynchronous connection between the two systems. Asynchronous behavior is required due to the event driven nature of electrical control systems as exemplified with the GOOSE (Generic Object Oriented Substation Event) protocol and the necessarily cyclic behavior of a DCS with its block processing cycle. Data events from the electrical side must be stored on a point-by-point basis for subsequent handling within the process control cycle. This unique feature is at the heart of the invention and effectively removes the need for buffered databases and exchange protocols between the two systems (i.e., gateways).

Electrical controllers allow for a user-written application using IEC 1131 type engineering tools. This is not the common language of the DCS. In contrast, the DCS control strategy allows for a set of well-defined BLOCKS which perform all necessary functions and communicate via a parametric interface to other local or networked blocks available within multiple networked controllers. Aspects of the present disclosure remove additional engineering tools and logic programs and have a single cyclic process control engine. This simplifies the abstraction design of control and allows a common control strategy involving multiple control blocks to be created and interact with both process field equipment and electrical field equipment and controllers as required.

Latency across protocol conversions is reduced due to the ability for the controller to host multiple protocols simultaneously and combine their data within the one namespace. This removes the need for multiple separate communications modules to be added, one for each protocol.

The controller 120 according to an embodiment can sit within either or both an electrical system 102 or process system 104 simultaneously. The interaction with either host system is independently managed. This allows the engineer to represent the process control data as a standard IEC 61850 IED within the electrical control environment and the electrical data as standard compound.block.parameters within the process control environment. Should either system fail for any reason, controller 120 continues to operate with very high availability until network connections are restored.

The lossless transmission of event data obtained from the electrical system and retransmitted within the DCS event system complete with time tag at electrical IED source requires a common time base propagated throughout the IEDs and controllers of process system 104 and electrical system 102. The ability for controller 120 to ensure that there is a common time within the substation environment in the plant, and matching the DCS time, ensures that root cause analysis by an operator or engineer as well as historical analytics for energy efficiency optimization are based on time consistent data.

Figure 2:
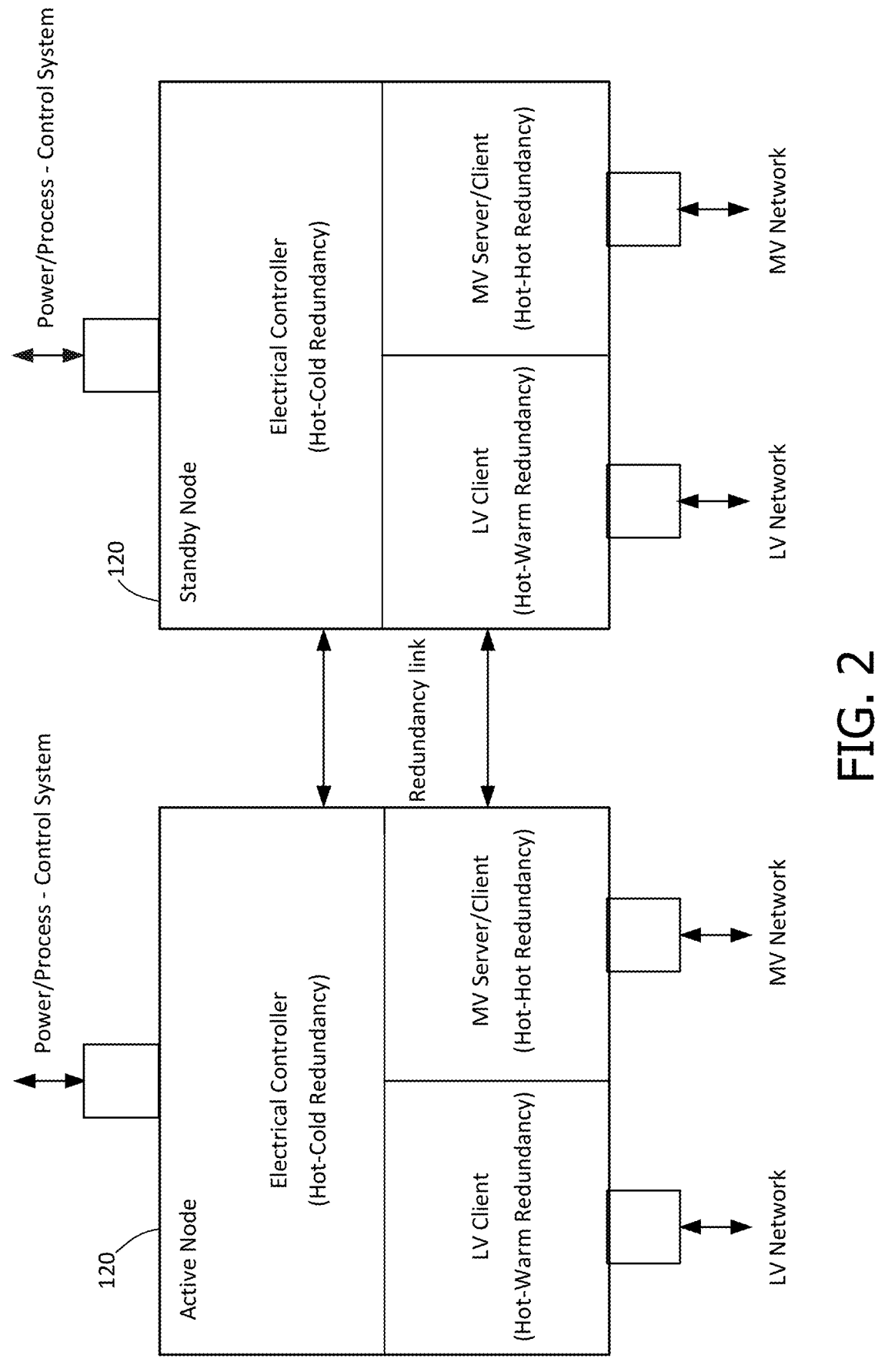
FIG. 2 illustrates a high availability architecture for a unified controller according to an embodiment.

FIG. 2 illustrates a high availability architecture for controller 120 according to an embodiment. The controller 120 adheres to diverse requirements of high availability for both electrical and process control systems 102, 104 and utilizes a controller redundancy architecture per specific domain (i.e., process or power) with high availability. In an embodiment, one of the redundant nodes is Active at a time on the process control network and switch-over can happen in a transparent way to the other nodes. This calls for a Hot-Cold redundancy architecture. The Active node scans the devices on the network for the LV electrical systems and the Standby node may only connect to the devices so that switchover can be done in less than a second. This calls for a Hot-Warm redundancy architecture. Both Active and Standby nodes concurrently communicate to all the IEDs for the MV electrical systems so that any switchover can be seamless (in a few milliseconds). This calls for a Hot-Hot redundancy architecture. The diverse high availability requirements have been integrated into the architecture of controller 120. The integrated redundancy architecture is platform agnostic. The remote terminal unit SCD6000 available from Schneider Electric is suitable meets both the functional and performance requirements of these systems and is suitable for implementing the redundancy architecture of the present disclosure.

As shown in FIG. 2, the disclosed controller 120 performs functionality typically associated with a gateway in addition to control functionality. The controller 120 in the illustrated embodiment includes three interfaces (one for Process Control Network, one for LV Network, one for MV Network), and a unique high-availability architecture for process and electrical control. Each of the three interfaces has unique requirements for redundancy. One controller (Active node) communicates with the other nodes on the process control network. The Active node can scan and control the nodes on the LV network. Both Active and Standby nodes run concurrently on the MV network. In an embodiment, there are three redundancy schemes required per interface: Hot-Cold on the process control network; Hot-Warm on the LV network; and Hot-Hot on the MV network. The redundant operation of controller 120 has different performance requirements on each interface. Advantageously, controller 120 supports all DCS services and networks and in addition to various unique redundancy schemes (Hot-Cold Redundancy, Hot-Warm Redundancy, Hot-Hot Redundancy) with no loss of event reporting from the sources.

Figure 3:
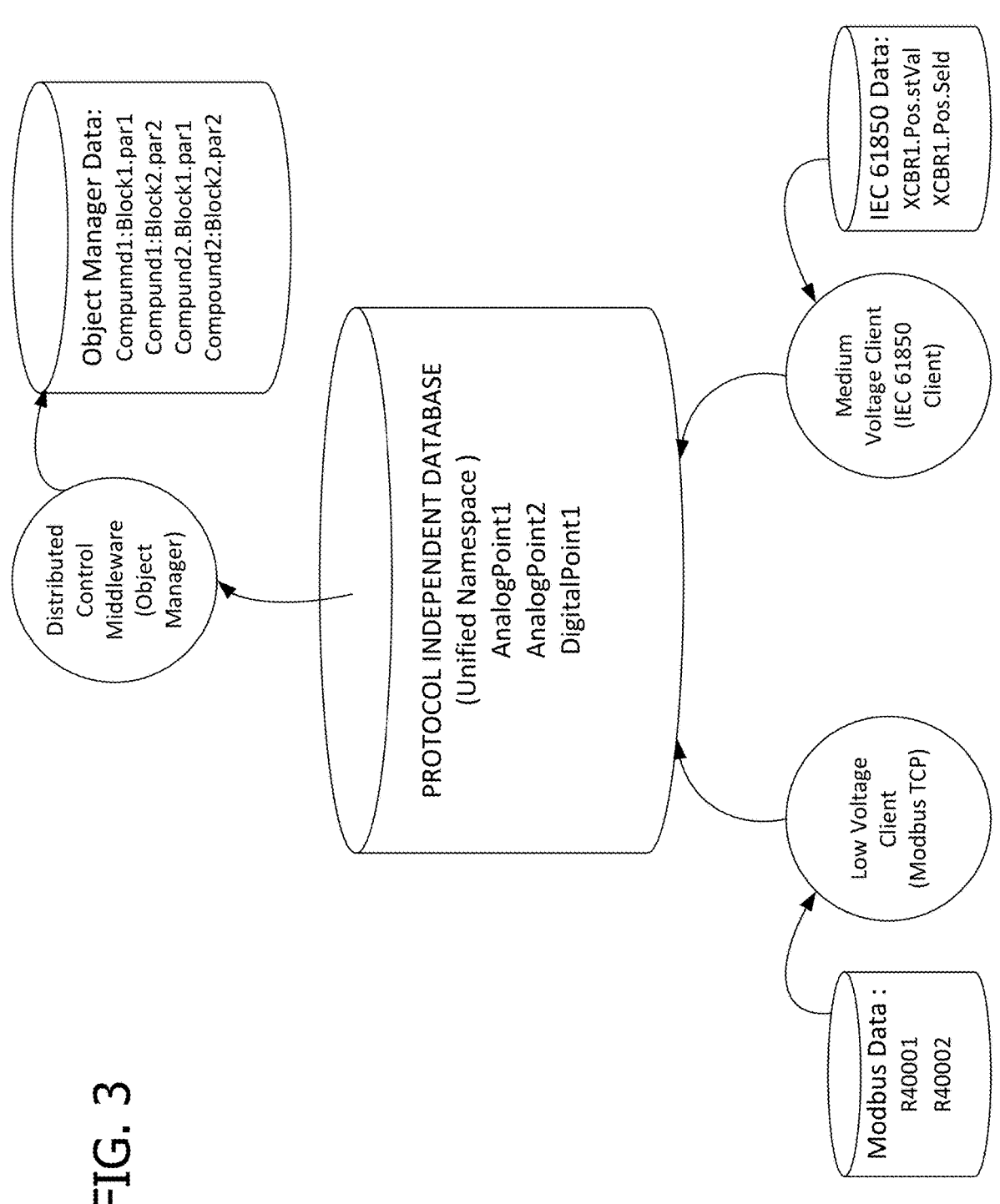
FIG. 3 is a block diagram illustrating a unified namespace for process and electrical domains according to an embodiment.

FIG. 3 is a block diagram illustrating a unified namespace for process and power domains according to an embodiment. Open standard protocols from the process and power domains update the data to the same database. Aspects of the present disclosure provide seamless namespace translation from power to process and vice-a-versa and seamless data flow with no latency of data update. No gateways are required for data acquisition and control. As shown in FIG.

3, a flexible architecture allows addition of any open standard protocol. In the illustrated embodiment, Distributed Control Middleware is a DCS component and Medium Voltage Client is an IC Brick component.

Figure 4:
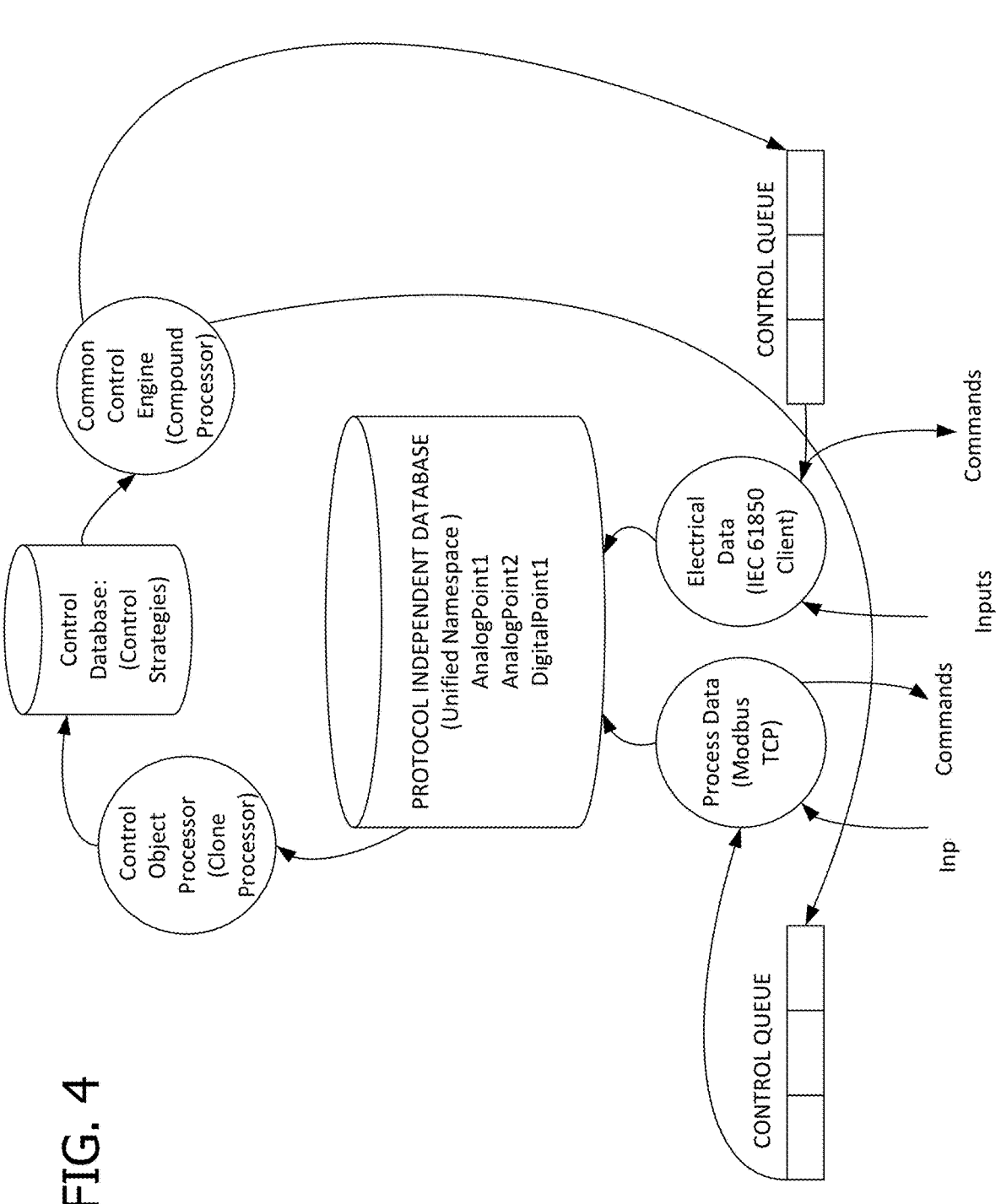
FIG. 4 is a block diagram illustrating a common control engine for process and electrical domains according to an embodiment.

FIG. 4 is a block diagram illustrating a common control engine for process and power domains according to an embodiment. Data from power and process domains is collected into the same database. Control strategies are executed seamlessly on the data from both the domains. Typically, conditions from the power domain can be used to control the equipment (e.g., motors) in the process. Controls can be executed to both the domains. As shown, Common Control Engine is a DCS component and Electrical Data is an IC Brick component.

Figure 5:
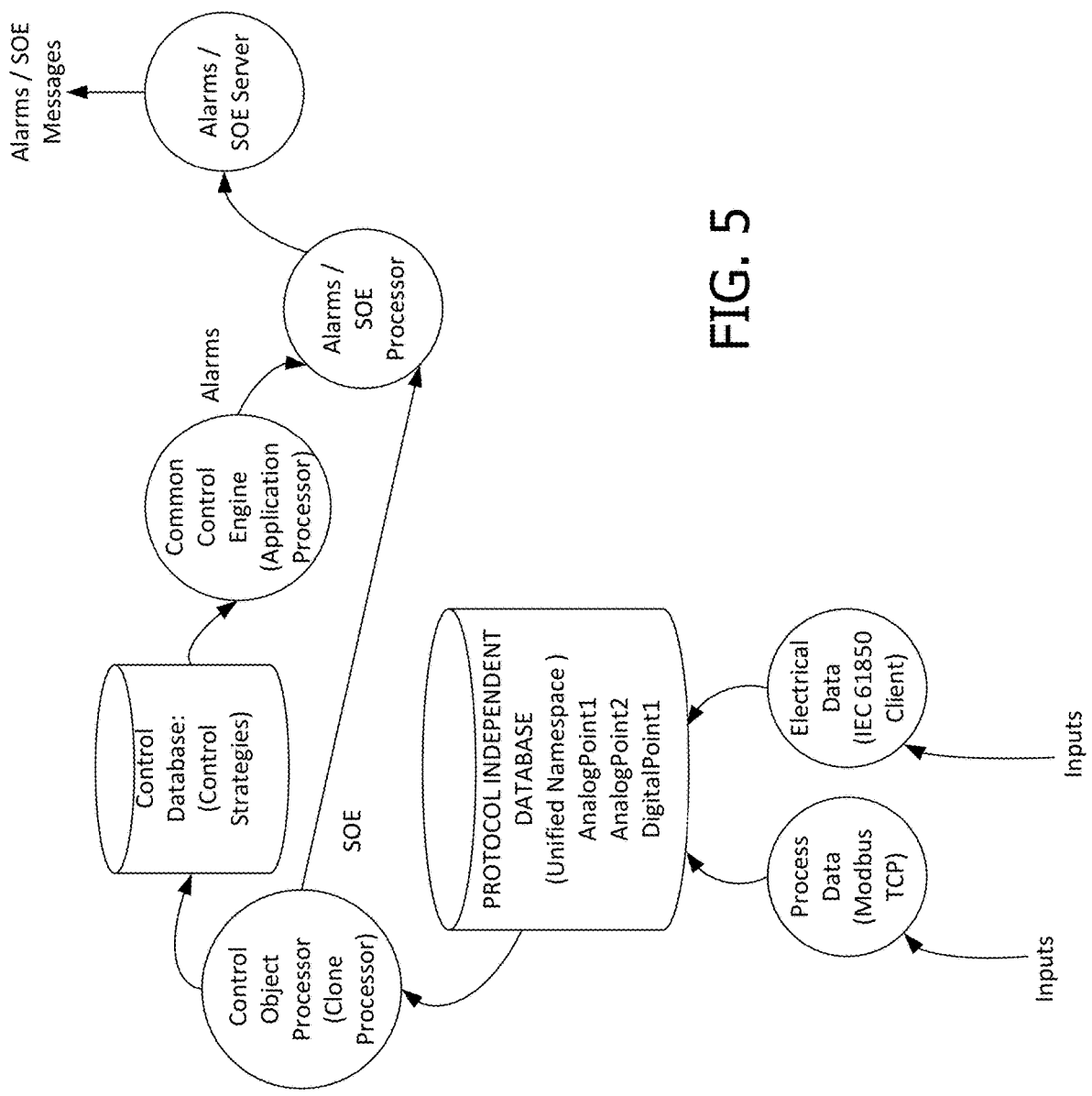
FIG. 5 is a block diagram illustrating common SOEs/alarms across process, electrical, and safety domains according to an embodiment.

FIG. 5 is a block diagram illustrating common SOEs/ alarms across process, power, and safety domains according to an embodiment. Data from power and process domains collected into the same database allows generation of Alarms and SOEs. Alarms are generated from the Control engine. SOEs are generated from Control Objects Processor asynchronously. Time stamps of the source are preserved for both the Alarms and SOEs. The illustrated embodiment also provides support for Operator Action Journal (OAJ). As shown, Common Control Engine, Alarms/SOE Processor, and Alarms/SOE Server are DCS components and Electrical Data is an IC Brick component.

Figure 6:
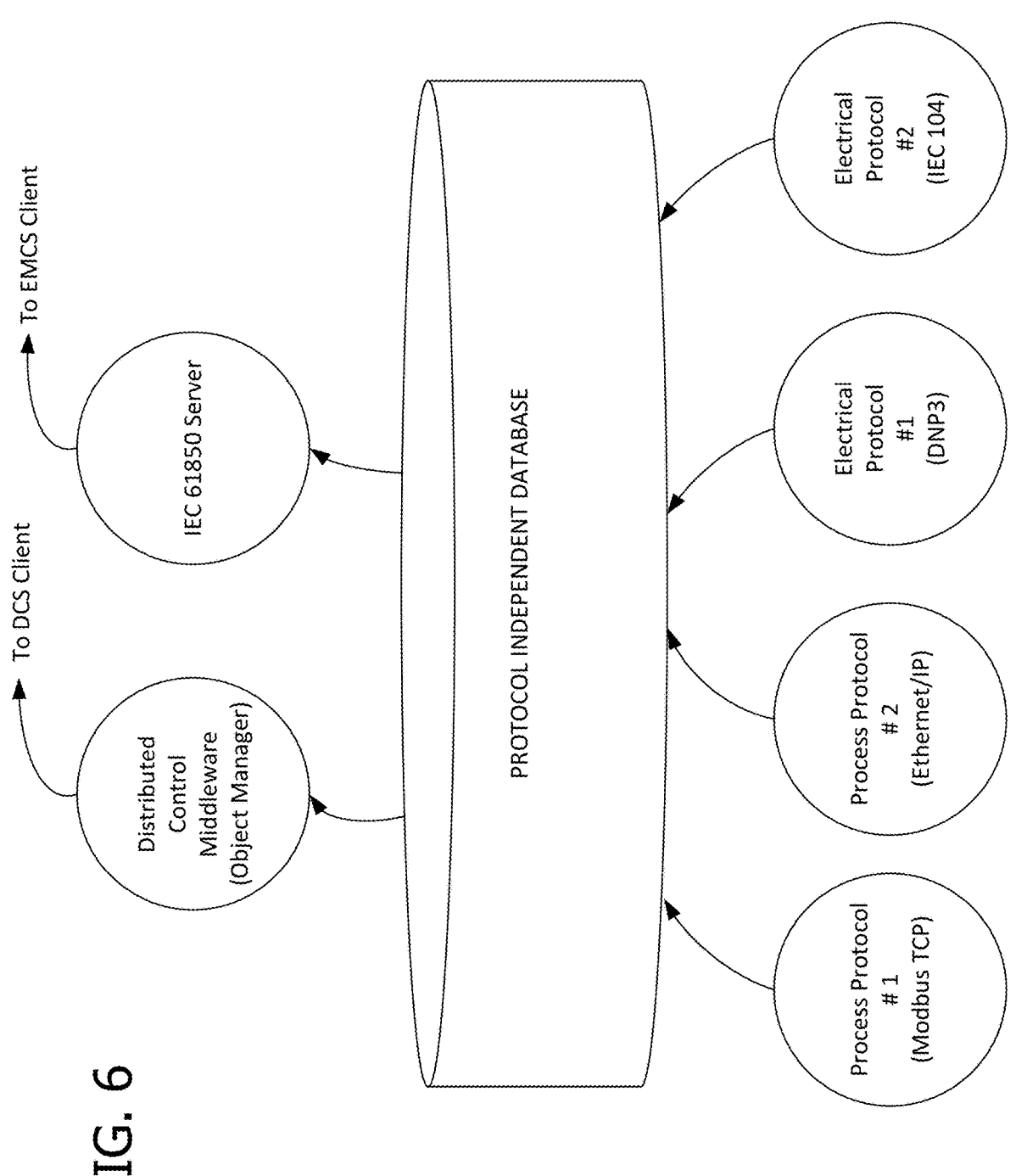
FIG. 6 is a block diagram illustrating multi-protocol support for electrical and process domains according to an embodiment.

FIG. 6 is a block diagram illustrating multi-protocol support for power and process domains according to an embodiment. Flexible and scalable architecture such as provided in the present disclosure allows addition of various open standard protocols from both Process and Power domains. The controller 120 can be the citizen of both DCS for process control and EMCS. Apart from the cyclic control of both process and power equipment, it can asynchronously respond to the events from electrical devices/IEDs. As shown, Distributed Control Middleware is a DCS component and IEC 61850 Server, Electrical Protocol #1, and Electrical Protocol #2 are third party stack components.

Figure 7:
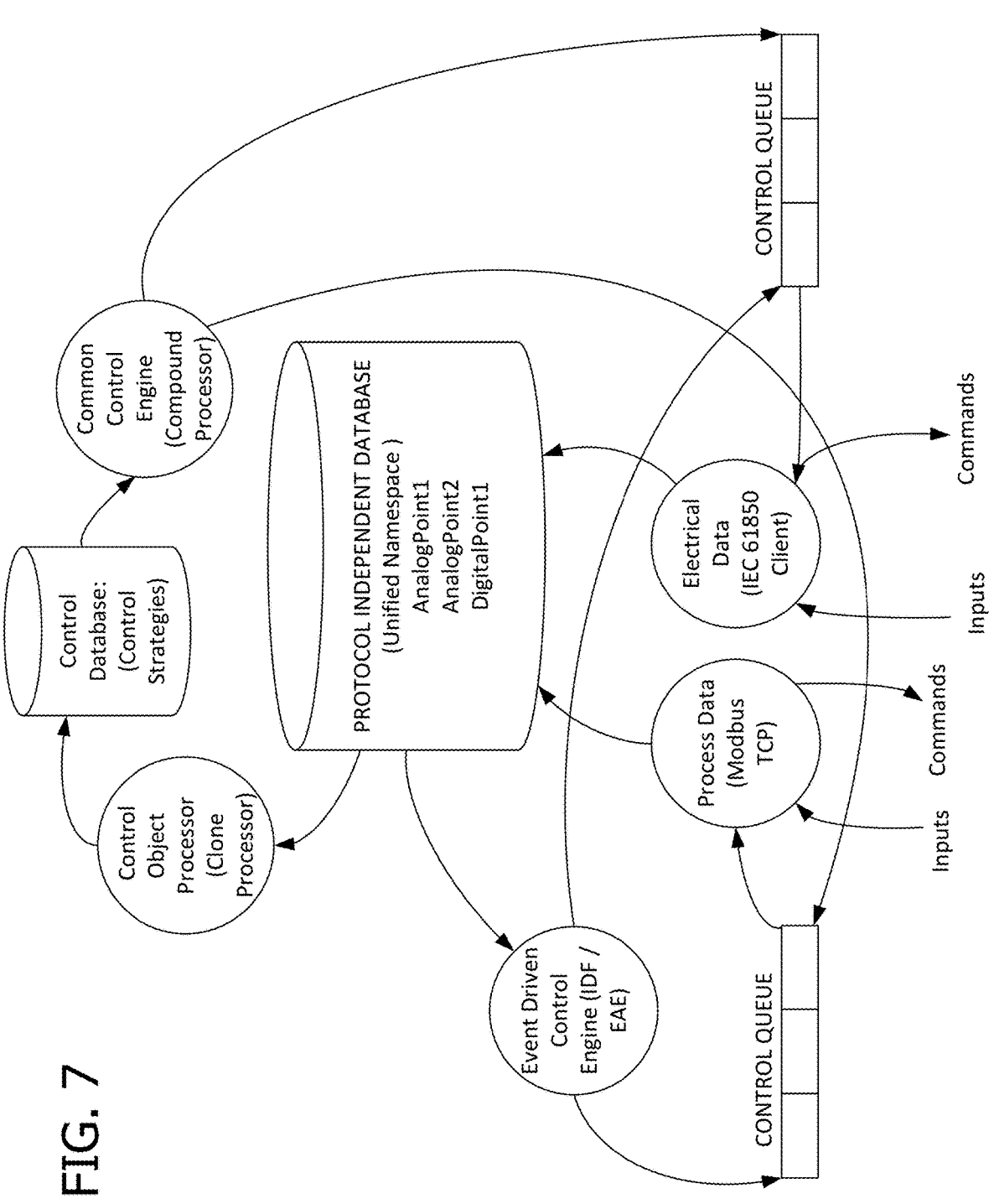
FIG. 7 is a block diagram illustrating support for both cyclic and event driven control engines for process and electrical domains according to an embodiment.

FIG. 7 is a block diagram illustrating support for both cyclic and event driven control engines for process and power domains according to an embodiment. A scan and event-driven (IEC 61499) control engine is provided for process and power control applications. The asynchronous events from power domain can be handled independently of scan-based control of process domain. Aspects of the present disclosure also support efficient CPU usage and increased IO counts. As shown, Cyclic Control Engine is a DCS component and Electrical Data is an IC Brick component.

Figure 8:
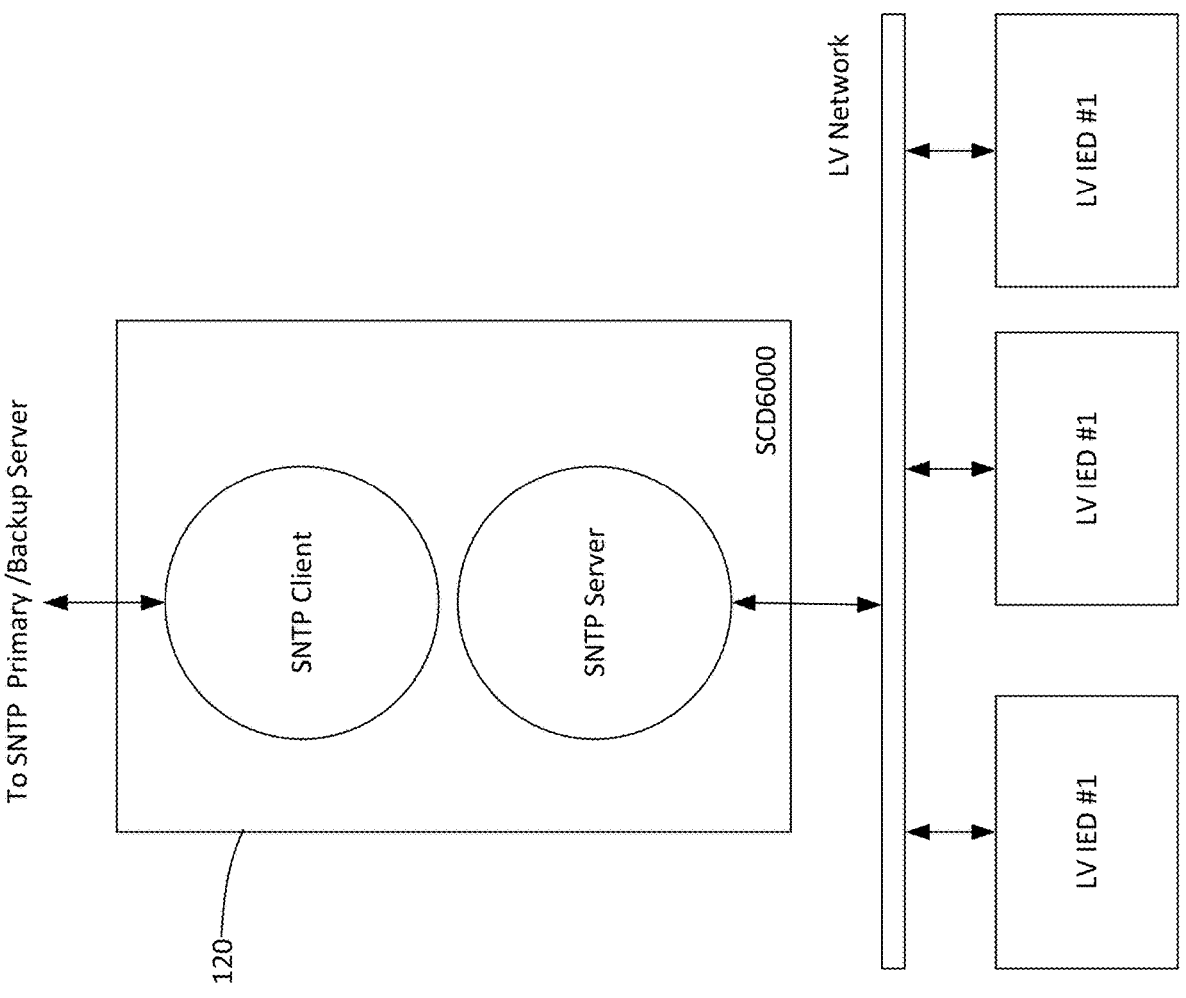
FIG. 8 is a block diagram illustrating a time synchronization process for low voltage devices according to an embodiment.

FIG. 8 is a block diagram illustrating a time synchronization process for downstream IEDs over SNTP or PTP according to an embodiment. The illustrated controller 120 provides flexibility in configuration of Time Synchronization of the controller. It can act as both the SNTP Client and Server and allows time synchronization of the downstream LV devices. Optionally controller 120 can also act as PTP server or client. The times of the downstream LV devices are synchronized when configured as an SNTP server.

Figure 9:
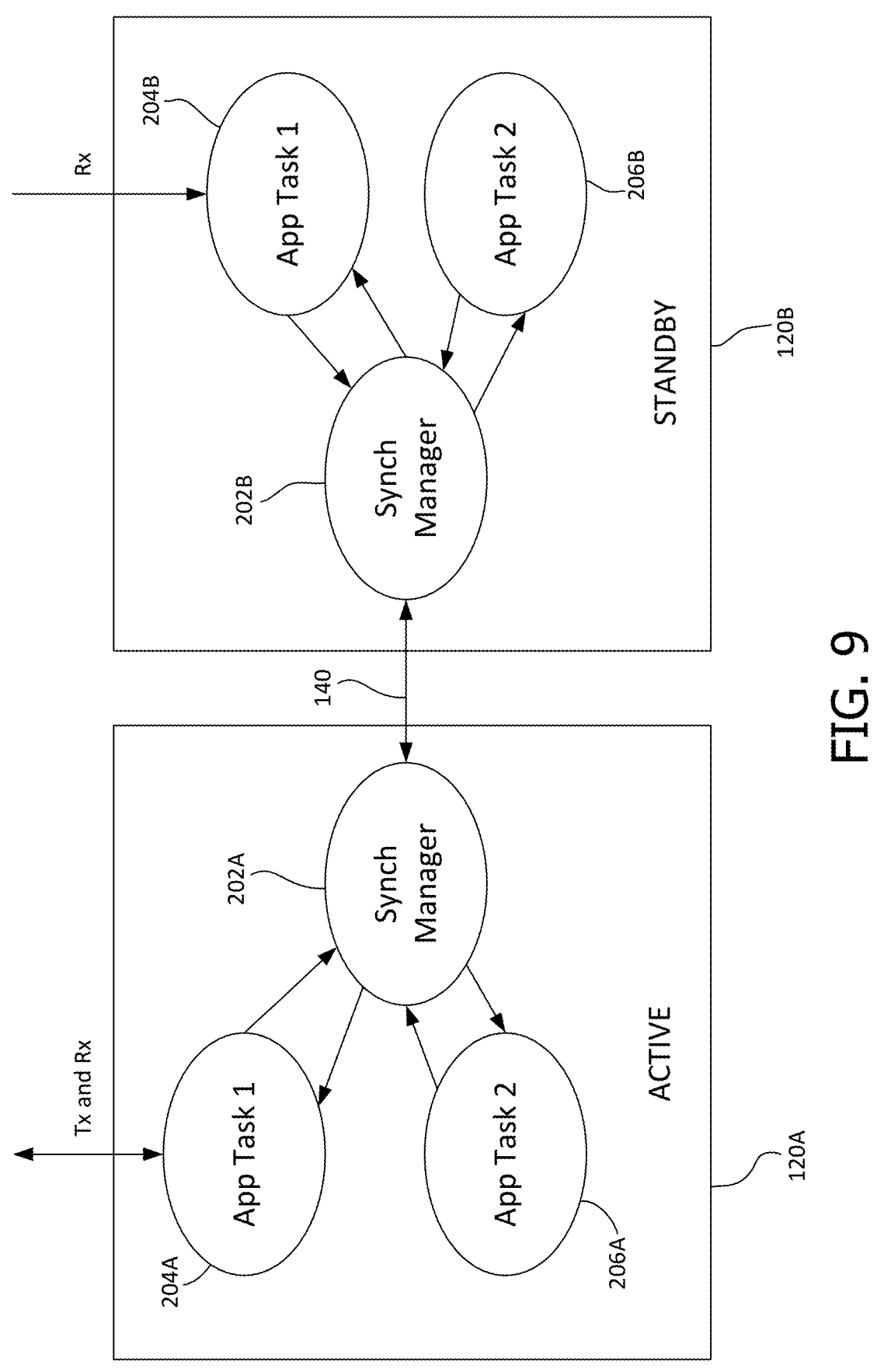
FIG. 9 illustrates a high availability (Hot-Cold redundancy) architecture for process control according to an embodiment.

FIG. 9 is a block diagram illustrating an embodiment of a high availability (Hot-Cold redundancy) architecture for synchronizing process control. A high availability mechanism referred to as Synch Manager 202A, 202B is defined to synchronize the functioning of two controllers 120A, 120B configured as Active (or Hot) and Standby, respectively. As shown, the Synch Manager 202A executes on controller 120A of, for example, process system 104, and Synch Manager 202B executes on controller 120B of, for example, electrical system 102, or vice versa. Both controllers 120A, 120B can perform either process or power functionality, one is Active and the other Standby. The same controller can work on the two networks (power and process) resulting in exchange of data and commands between the two networks. This abstract mechanism provides one or more application programming interfaces (APIs) for synchronizing the functioning of one or more application tasks 204A, 206A executing on controller 120A and corresponding application tasks 204B, 206B executing on controller 120B. It is to be understood that a synchronization manager interface such as Synch Manager 202A, 202B synchronizes any number of one or more application tasks.

The Synch Manager 202A, 202B ensures that the application tasks 204A, 204B are executed in synch and the application tasks 206A, 206B are executed in synch, while the details of the synchronization are handled by the application tasks themselves. Synchronization is achieved by means of synchronization points (also referred to as Synch Points), which are the points of execution of application tasks 204A, 204B and 206A, 206B that ensure synchronous execution of the tasks. The synchronization points are defined for the same domain (power/process) controller application tasks. The two controllers which constitute a Hot/-Standby pair, run the same applications (same configuration and firmware) and hence the application tasks are the same across the two peer controllers.

The APIs provided by Synch Manager 202A, 202B ensure synchronization of application "State" and "Data." In an embodiment, Synch Manager 202A, 202B transmits a first state to the same domain (power/process) controller, running the same application (configuration and firmware). These APIs report "Success" or "Failure" or "Timeout" of the synch operation. The application tasks 204A, 204B and 206A, 206B determine actions to be taken post-synchronization. Due to the application agnostic nature of the synch APIs, any application task in controller 120 can use them and build its own synchronization mechanism based on the application-specific functions. For this reason, Synch Manager 202A, 202B can be used by any controller 120 that has spare communication interfaces for synchronization. Advantageously, no hardware modifications are required in the existing controller 120 to achieve high availability of operations.

Aspects of the present disclosure provide a high availability scheme defining an abstract synchronization scheme that is both platform and application agnostic. This scheme allows a simplex controller to be converted to Hot/Standby pair of controllers 120A, 120B without requiring any hardware modifications. It can work on the existing communication interfaces (e.g., lower bandwidth (as low as 2.5 MBPS)) and is agnostic with respect to communication technology. This is achieved by minimizing on the data throughput for the synchronization. The overall efficiency of the controller operation is also increased in the redundant pair configuration by defining loosely coupled controllers. In this manner, aspects of the present disclosure provide a controller capable of high availability of: control applications; controller online configuration and diagnostics; alarms; SOEs; data distribution commands communication; network channel (network communication); data acquisition and control (e.g., Modbus, IEC 61850, and hardwired input/output); and the like.

In an embodiment, a unified diagnostic tool (System Manager) monitors the functioning of both process control system 104 and electrical system 102. The health information of the electrical controller 120 and the electrical devices monitored/controlled by it is monitored using the diagnostic tool.

Referring further to FIG. 9, the Synch Manager 202A, 202B provides an application agnostic synchronization mechanism for synchronization of application tasks 204A, 204B and 206A, 206B. This abstract mechanism defines the application interface for state and data synchronization whereas application-specific synchronization is defined by the application tasks themselves. The two nodes on their respective networks, Active and Standby, run concurrently for the data they can receive independently and share the data that is available to the Active node, i.e., controller 120A. Low data throughput for synchronization shares minimal data for application synchronization. In operation, Synch Manager 202A, 202B defines Synch Points, which are the execution statements to be synchronized in the application tasks 204A, 204B and 206A, 206B and exchanges synch messages. The Synch Manager 202A, 202B reports Synch Success, Synch Failure/Timeout to the respective application task 204A, 204B, 206A, 206B. In turn, application task 204A, 204B, 206A, 206B defines any synchronization action post-synch feedback. In an embodiment, each node periodically checks for the presence of its peer node, and determines the role of the node as either Active or Standby. If the peer node is lost, it needs to be recovered once it is back online. In this instance, the database is shared with the peer and resynchronization is established following the recovery.

A Synch Manager based synchronization mechanism used to synchronize state and data of the application tasks. U.S. patent application Ser. No. 17/679,744, filed Feb. 24, 2022, the entire contents of which are incorporated herein by reference, describes a high availability controller through the use of an application programming interface for state and data synchronization between the power and process domains. Both nodes run concurrently by synchronizing the states of the Application tasks. Minimal data is exchanged between the two nodes. The Active nodes communicate to the other nodes on the process control network and update the Standby node. The Active node sends one shot as well as Periodic synch messages and expects the response from the Standby.

Figure 10:
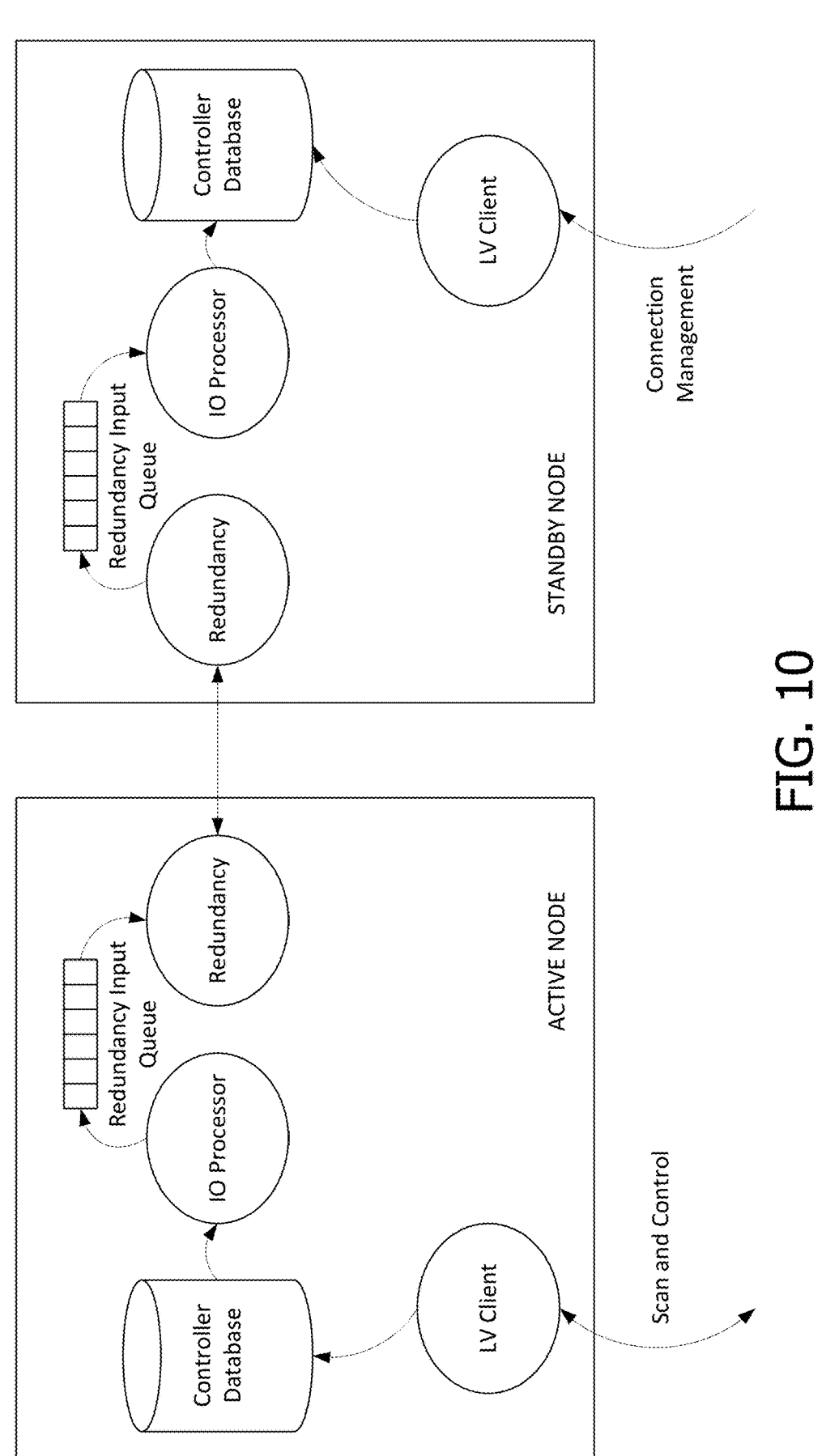
FIG. 10 illustrates a high availability (Hot-Warm redundancy) architecture for low voltage control according to an embodiment.

FIG. 10 illustrates a high availability (Hot-Warm redundancy) architecture for low voltage control according to an embodiment, including a proprietary redundancy protocol providing synchronization of the controller database from Active node to Standby node. Event driven updates conserve the number of updates and standard objects are defined for data synchronization. The Active node scans the LV devices and issues commands and the Standby node maintains transport connection to LV devices. In this embodiment, file transfer enables configuration and firmware updates and redundancy control uses role determination and checks on the health of the redundancy link.

Figure 11:
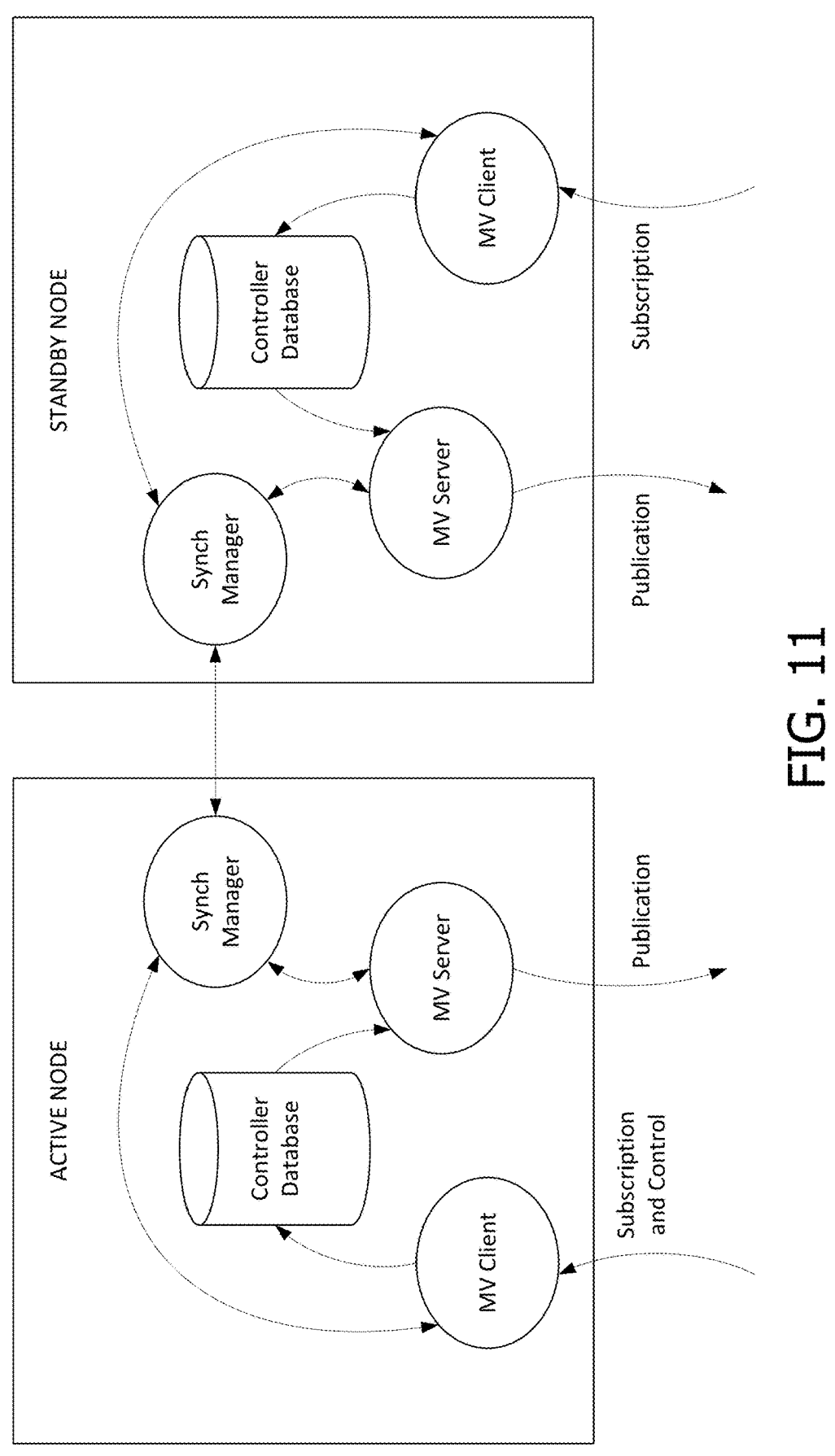
FIG. 11 illustrates a high availability (Hot-Hot redundancy) architecture for medium voltage control according to an embodiment.

FIG. 11 illustrates a high availability (Hot-Hot redundancy) architecture for medium voltage control according to an embodiment. Both Active and Standby nodes run concurrently an MV Server and an MV Client application. A Synch Manager is used to ensure the synchronization of the applications between Active and Standby nodes. U.S. patent application Ser. No. 17/679,744, filed Feb. 24, 2022, the entire contents of which are incorporated herein by reference, describes a high availability controller through the use of an application programming interface for state and data synchronization between the power and process domains. In this embodiment, the MV server publishes the redundancy status via the standard communication protocol (e.g., IEC 61850). The MV client subscribes to the communication from the server to know its redundancy status. It receives the data from the Active server node and discards the data from the Standby server node. The commands are issued to Active server node.

Figure 12:
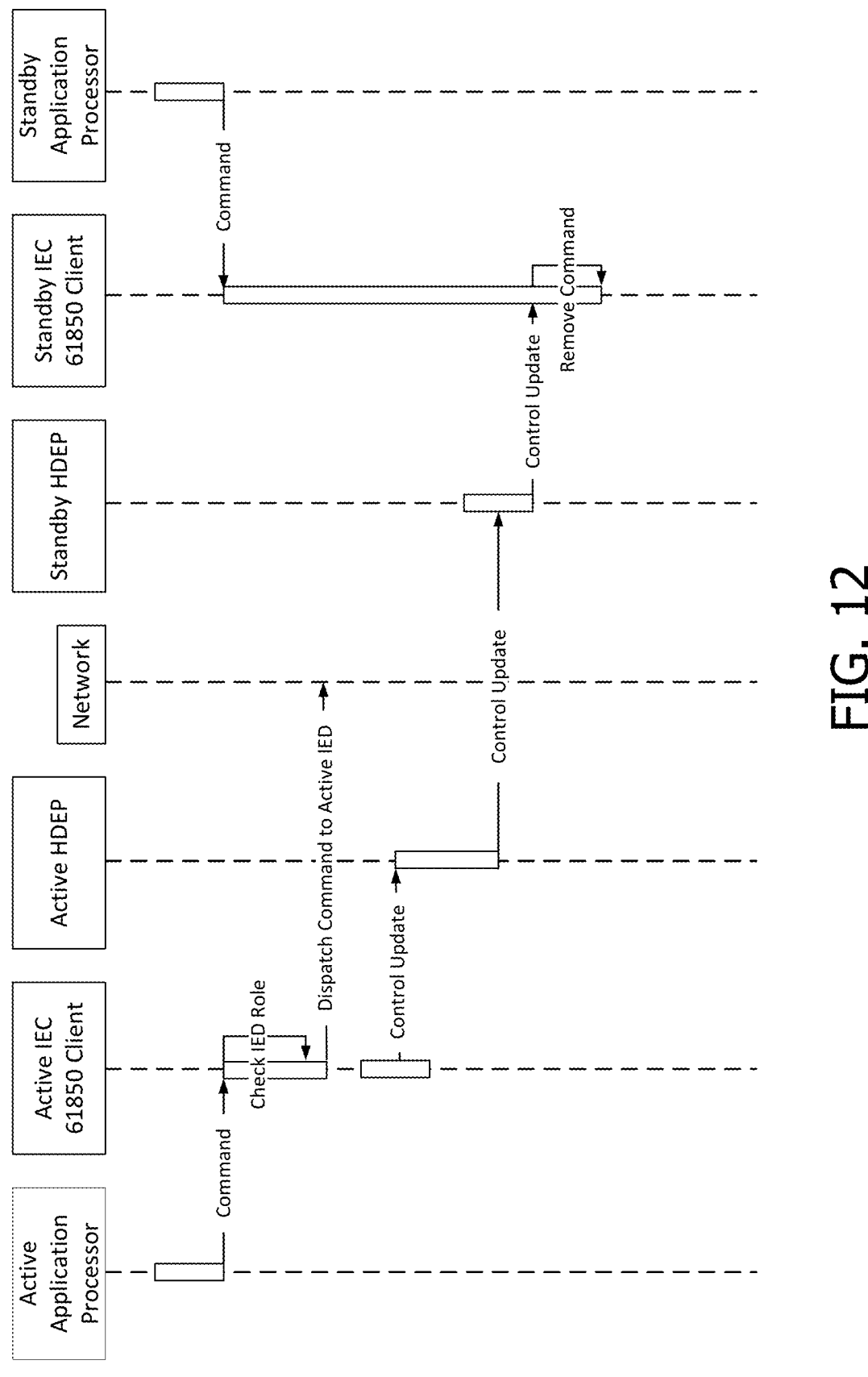
FIG. 12 illustrates a high availability (Hot-Hot redundancy) commands synchronization process according to an embodiment.

FIG. 12 illustrates a high availability (Hot-Hot redundancy) commands synchronization process according to an embodiment. In the illustrated embodiment, commands are processed by both Active and Standby nodes. Redundancy status of the Server IED is checked. The Active controller sends a command to the Active Server. Command execution is then synchronized with the Standby node. The Standby node discards the command post synchronization. In the event of failure of the Active node before the synchronization, the command is reissued by the Standby node.

Figure 13:
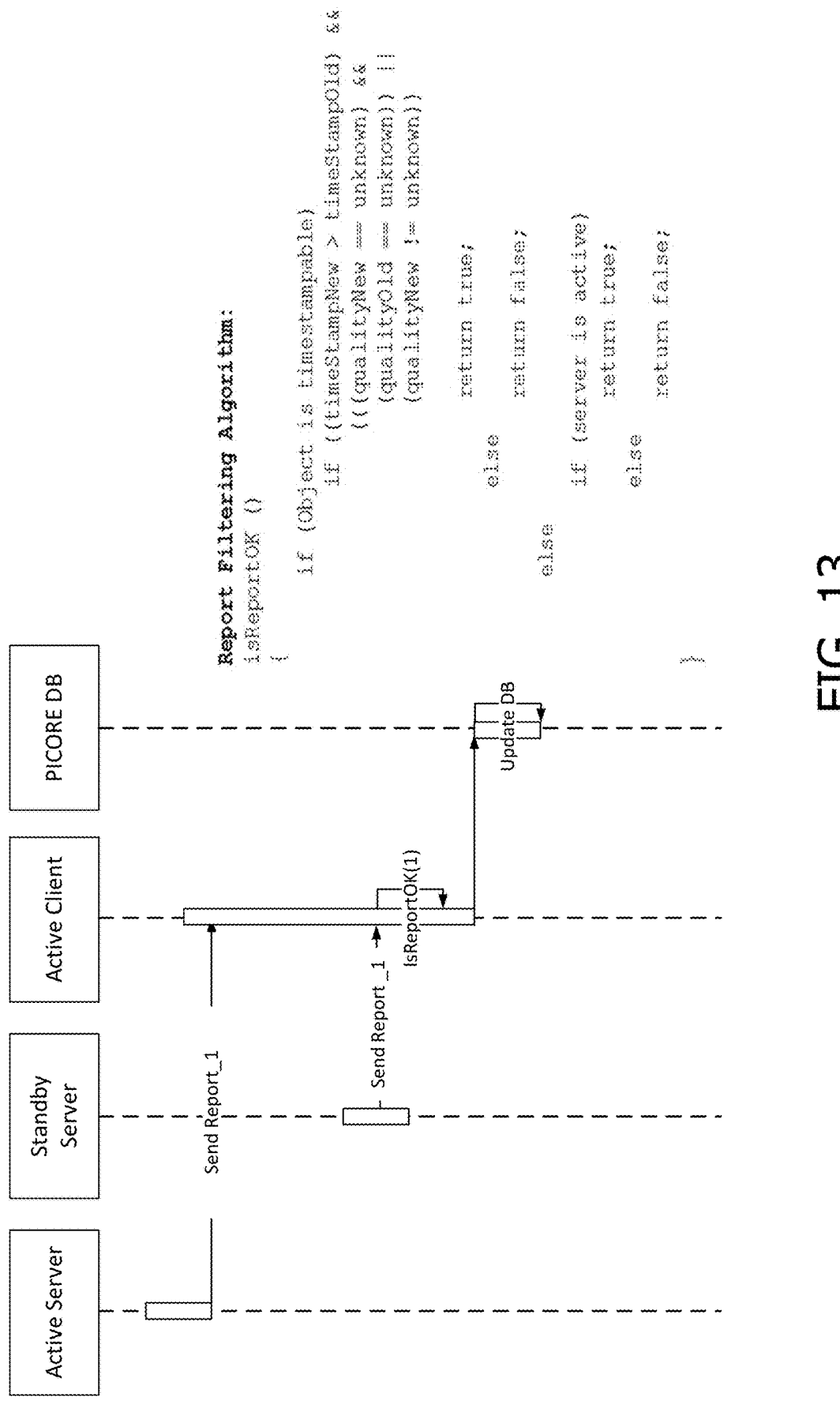
FIG. 13 illustrates a high availability (Hot-Hot redundancy) reports synchronization process according to an embodiment.

FIG. 13 illustrates a high availability (Hot-Hot redundancy) reports synchronization process according to an embodiment. Reports are processed by both Active and Standby nodes. Filtering of reports is done using an algorithm that is based on Time & Quality parameters of the Data Attributes. Typically, data from the Active server is filtered for the update and data from the Standby node is updated in case of a switch-over.

Figure 14:
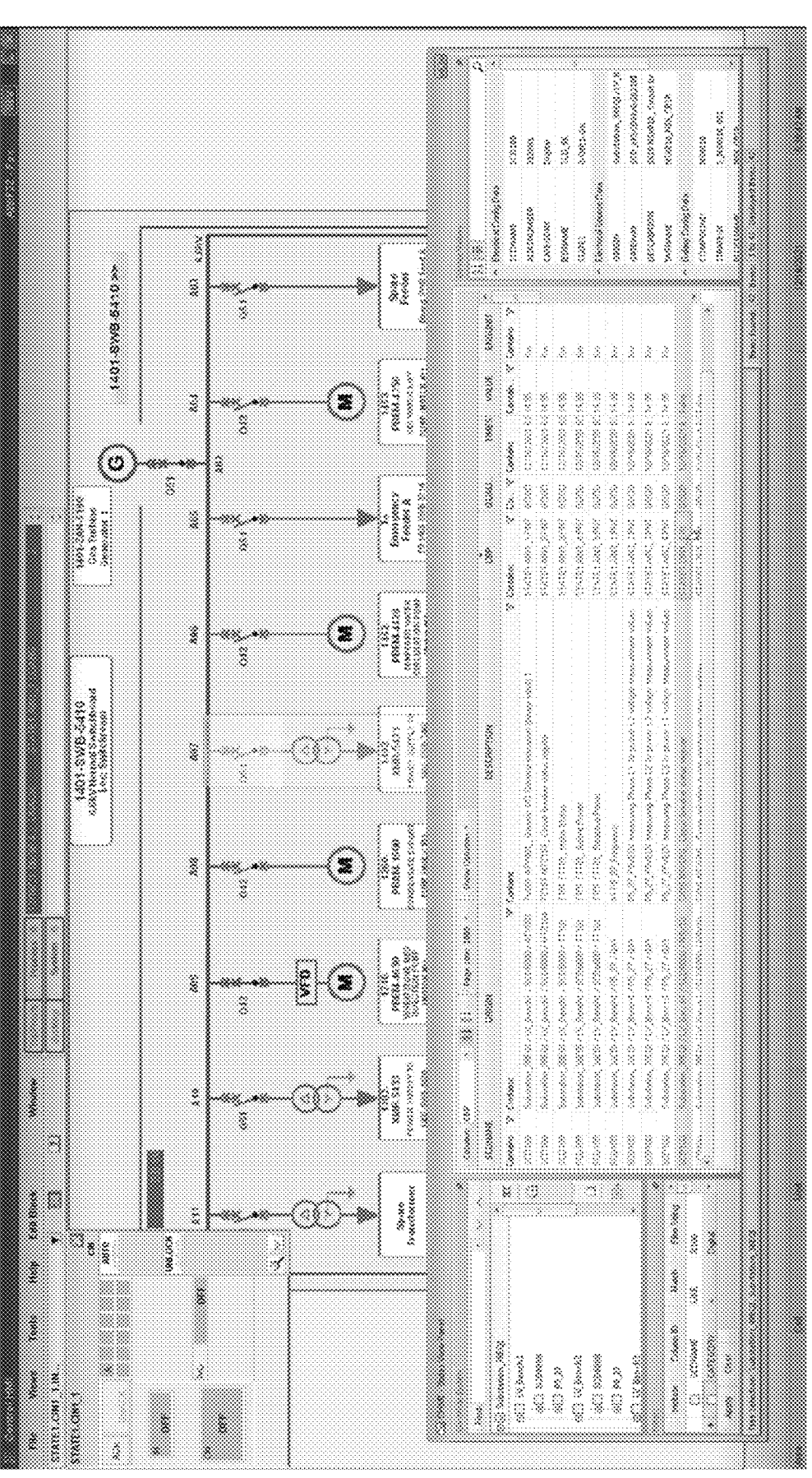
FIG. 14 is an example screen shot illustrating Navigational Dynamic List Views according to an embodiment.
Figure 15:
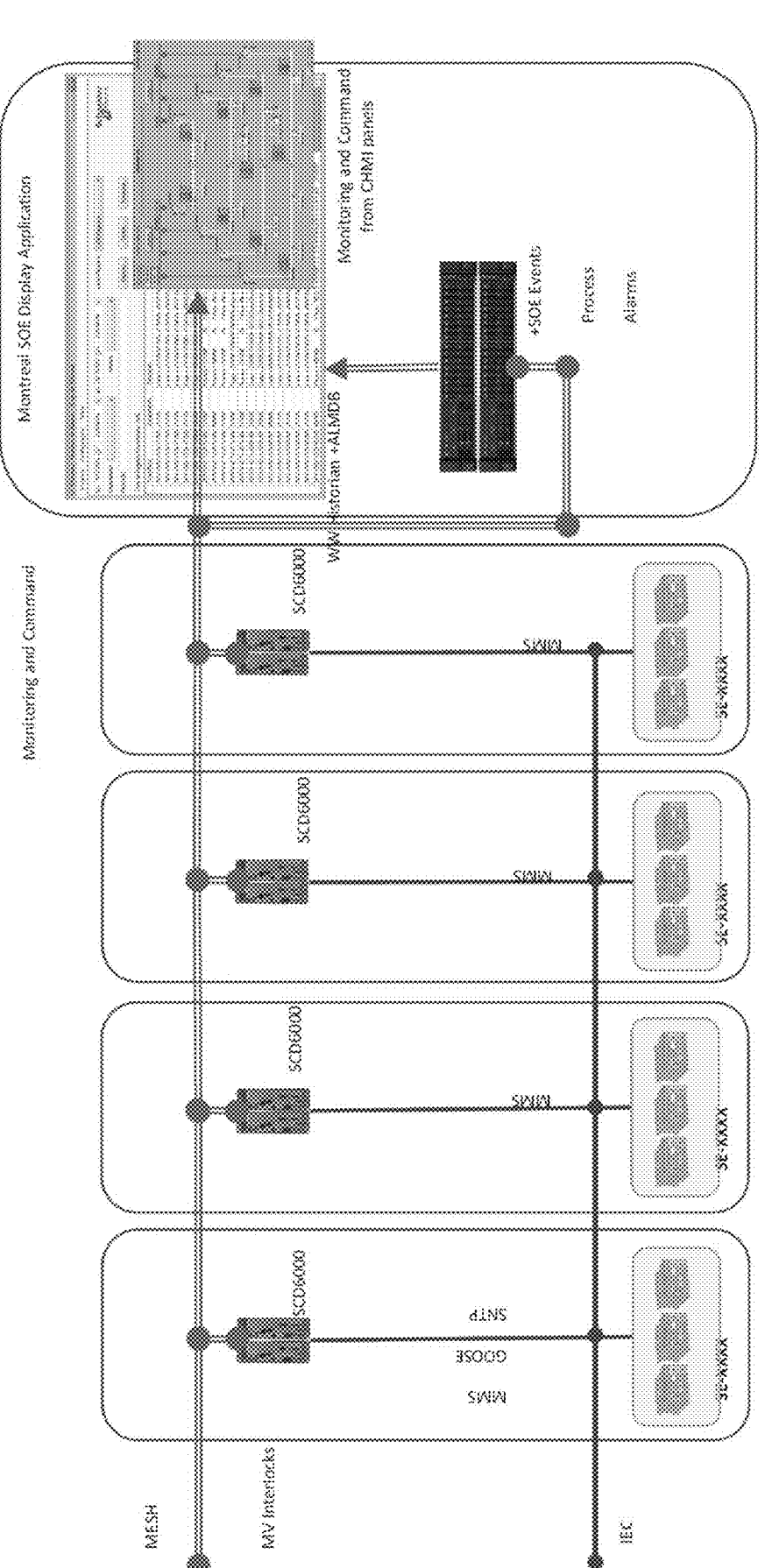
FIG. 15 is a block diagram illustrating Low Latency High Availability interfaces to Electrical Networks according to an embodiment.
Figure 16:
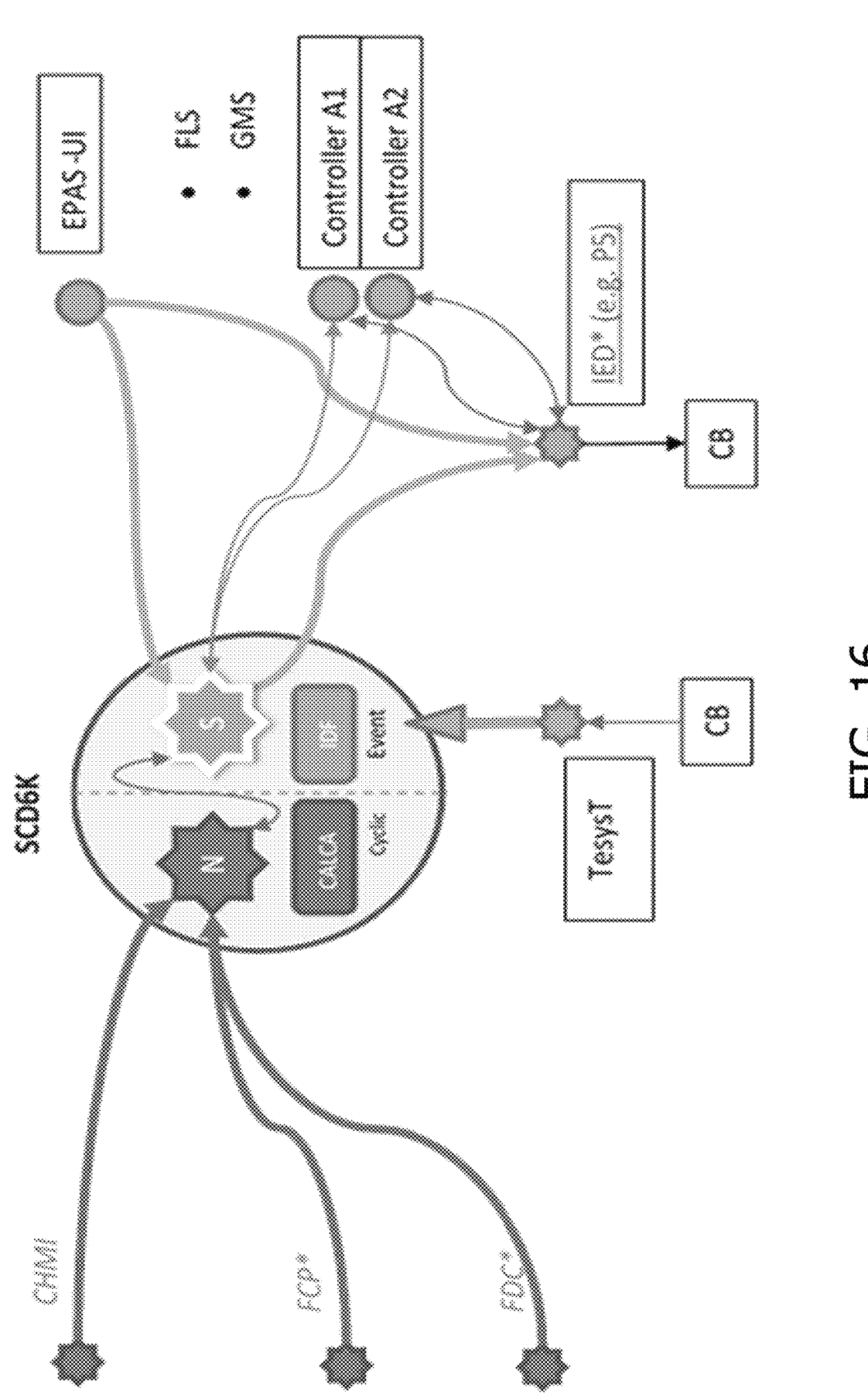
FIG. 16 is a block diagram illustrating an example integration of process and electrical domains according to an embodiment.
Figure 18:
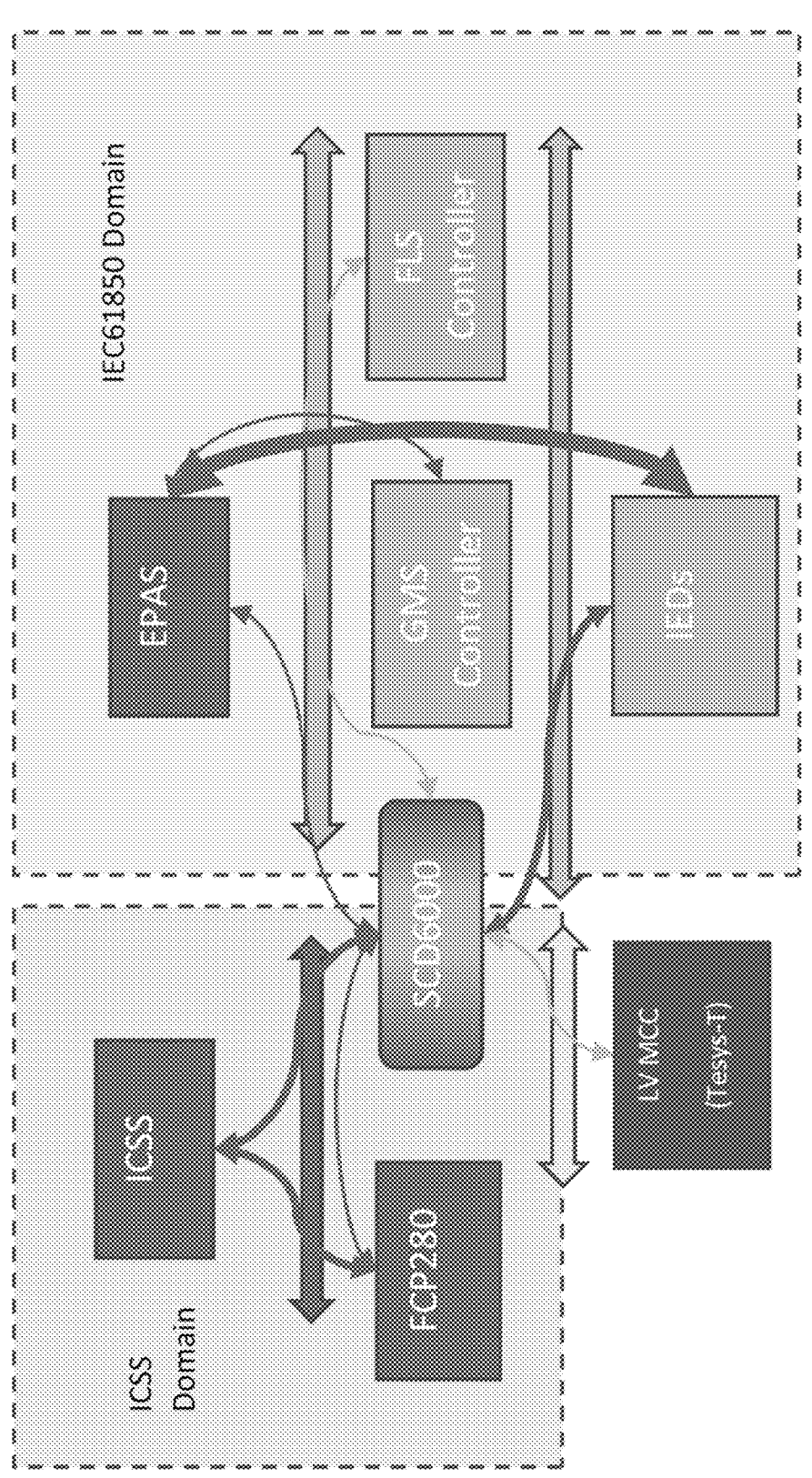
FIG. 18 is a block diagram illustrating an example data flow according to an embodiment.

FIGS. 14-18 illustrate further aspects of the present disclosure. FIG. 14 is an example screen shot illustrating navigational dynamic list views for quickly navigating from single line diagram (SLD) and list views to dynamic detail faceplates per device. FIG. 15 is a block diagram illustrating low latency high availability interfaces to electrical networks providing a high level of cybersecurity in a simpler design—Common Information Model {C:B:P}. FIG. 16 is an example of integrating process automation and power management according to an embodiment. FIG. 17 identifies components of the integrated process and power systems. FIG. 18 is a block diagram illustrating an example data flow in which only the data and controls required from ECMS systems are pulled.

In operation, a method embodying aspects of the present disclosure performs process control and monitoring along with electrical control signaling and monitoring within the same control strategy directly from a controller. The method comprises mapping a unified namespace based on unique process control names to source IED names based on the IEC 61850 namespace and using a DCS function_block.parameter automation across the process and electric power domains. The method further comprises incorporating all SOEs arising from IEC 61850 connected IEDs within the common process, safety, and power SOE record set and incorporating SOE buffers to allow for all pending events to be published with source time tag without disturbance or constraint on the control processor cycle. Advantageously, the method provides the ability to manage multiple dissimilar protocols in both client and server form within the same DCS controller, asynchronously respond to protocol requests including polled, buffered, and unbuffered, for connection based protocols within the same controller, and support time synchronization of downstream IEDs via either PTP or SNTP protocols.

In addition, the controller supports all DCS services and networks as well as one or more of the following unique redundancy schemes: High Availability Redundancy on the DCS control information network—co-resident with fault tolerant peer controllers; Hot/Hot parallel redundancy in support of Electric Power Management Systems attached via IEC 61850 Server; and Hot/Warm failover redundancy in support of Single and Dual connected Modbus/TCP devices. In an embodiment, there is no loss of event reporting from source.

Moreover, no common mode failure of memory or processor or network interface exists within the controller, which is in advance of fault tolerant controllers. Common mode failure is avoided by elimination of a control bus between the two controllers and synchronization and coordination of database cloning between controllers is achieved by fault resilient serial and token ring connectivity using diverse paths. A memory fault on one controller will not propagate without detection to the backup controller. And a network fault on any interface on one controller will not cause failure of the corresponding network interface on the backup controller.

Aspects of the present disclosure advantageously provide several benefits over conventional controllers. For instance, the unified namespace of the gateway and control functionalities allows issuing controls over electrical protocols, including hardwired controls as well as "softwired" controls (issuing controls over IEC 61850 Client). Real time updates of corresponding electrical parameters due to a common address space allows building efficient process control strategies with the relevant electrical parameters resulting in improved process controls and operations. Also, eliminating a separate controller and gateway nodes improves the latency of data updates from the field and execution of commands. In an aspect, controller 120 is dual ported (on EMCS and DCS networks), which provides information coherency and improved overall engineering efficiency by eliminating the data mappings for different nodes on the two networks.

This common infrastructure on process and electrical systems eliminates gateways and hardwired IO modules with the unified controller 120 and makes possible the use of common HMI and historians as well as a common cybersecurity approach between DCS and EMCS systems. For instance, the common infrastructure enabled by the unified controller 120 permits the control HMI of process system 104 of FIG. 1 to be configured for monitoring not only DCS operations but also EMCS operations. The control HMI in this embodiment presents a user interface displaying the substation layout of electrical system 102 with voltage levels in addition to the process-side information. In other words, an operation can view electrical-side information in the process-side HMI. Similarly, process operations 126 may include diagnostic tools capable of launching electrical system diagnostics from the process-side and a unified backup. The unified namespace of the data from DCS and EMCS systems also permits generation of common SOEs (from both process and electrical systems) thus improving post trip analysis.

The data from electrical systems (LV & MV systems) is sent to the control HMI from the electrical controller 120. The control HMI allows an operator to view both the process data and the relevant electrical data on the same screen. The operator can also issue commands to operate IEDs 110 in the electrical system 102. In addition, alarms and SOEs from electrical system 102 are shown along with process alarms, enabling efficient analysis of any plant equipment trip or similar issues.

Figure 19:
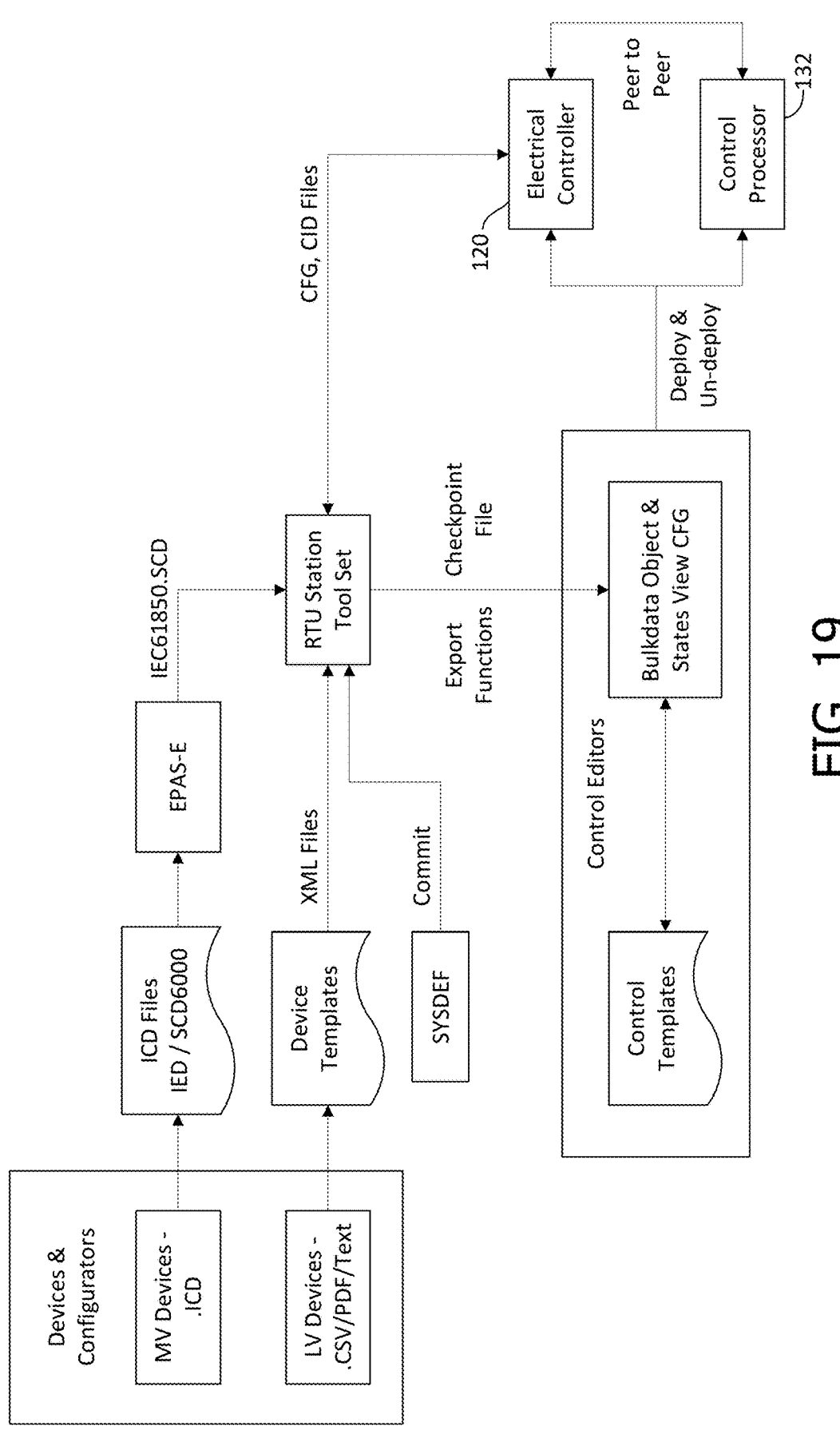
FIG. 19 is a flow diagram illustrating an example engineering workflow according to an embodiment.

Referring now to FIG. 19, an engineering workflow. An IEC 61850-based system specification and system configuration tool, such as EcoStruxure™ Power Automation System Engineering EPAS-E available from Schneider Electric, receives device configuration template files for the MV devices. The EPAS-E tool provides electrical system configuration (e.g., reports subscription, single line diagrams, electrical data mapping). An RTU station tool set of the electrical controller receives IEC 61850-based configuration files from the EPAS-E tool, device templates for the LV devices and a DCS system (SYSDEF) configuration. In the illustrated embodiment, the RTU station tool set provides export functions for exporting the electrical system configuration data to a bulkdata object responsible for instantiating the templates of DCS control strategies and states view configuration, which is part of the Foxboro Control Editor software available from Schneider Electric. The Control Editor deploys control strategies to the unified electrical controller 120 as well as the control processor 132. In addition, the RTU station tool set downloads the LV/MV device communication configuration to the unified electrical controller 120.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor(s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. A method of configuring a controller for use in both a process domain and a power domain of an industrial operation, the power domain including one or more intelligent electronic devices (IEDs), the method comprising:

mapping a unified namespace to source device names of the IEDs in the power domain, wherein the unified namespace is based on unique process control names of the process domain;

generating a common record set of sequence of events (SOEs) for the process domain and the power domain and incorporating the SOEs arising from the IEDs in the common record set; and identifying an application task executing on the controller and on a standby controller capable of synchronization therewith and synchronizing execution of the application task on the controller and the standby controller;

wherein the controller performs process control and monitoring along with electrical control signaling and monitoring within a single control strategy directly from the controller in accordance with the common record set of SOEs and wherein the controller and the standby controller integrate the process domain and the power domain of the industrial operation.

2. The method of claim 1, further comprising storing data events from the power domain on a point-by-point basis for handling within a processing cycle of the process domain.

3. The method of claim 1, further comprising publishing pending events with source time tag information.

4. The method of claim 1, further comprising incorporating SOE buffers to allow for pending events to be published with source time tags without disturbance or constraint on the control processor cycle.

5. The method of claim 1, further comprising managing multiple dissimilar protocols both in client and server form within the controller.

6. The method of claim 1, further comprising asynchronously responding to protocol requests for connection-based protocols within the controller.

7. The method of claim 1, further comprising synchronizing IEDs via at least one of Precision Time Protocol (PTP) and Simple Network Time Protocol (SNTP).

8. The method of claim 1, wherein the source device names are based on an IEC 61850 standard communication protocol namespace.

9. The method of claim 1, further comprising using distributed control system (DCS) function_block.parameter automation across the process and power domains via the controller.

10. The method of claim 1, wherein the controller includes a first interface associated with a process control network, a second interface associated with a low voltage (LV) network, and a third interface associated with a medium voltage (MV) network, and further comprising implementing a first redundancy scheme on the process control network, a second redundancy scheme on the LV network, and a third redundancy scheme on the MV network, the first, second and third redundancy schemes being different from each other.

11. The method of claim 10, further comprising coupling a standby controller to the controller via a redundancy link, wherein the controller and the standby controller coupled thereto integrate the process domain and the power domain of the industrial operation, and further comprising coupling both the controller and the standby controller to the first, second, and third interfaces.

12. An electrodynamic controller having a high availability architecture for control in both a process domain and in an power domain of an industrial operation, comprising:

a first interface associated with a process control network;

a second interface associated with a low voltage (LV) network;

a third interface associated with a medium voltage (MV) network;

a database storing a unified namespace, the unified namespace mapping source device names of devices in the power domain based on unique process control names of the process domain;

a processor; and a memory device storing processor-executable instructions that, when executed, configure the processor for performing both process control and monitoring and electrical control signaling and monitoring within a single control strategy directly therefrom;

wherein the controller is configured to implement a first redundancy scheme on the process control network, a second redundancy scheme on the LV network, and a third redundancy scheme on the MV network and wherein the first, second and third redundancy schemes are different from each other.

13. The controller of claim 12, wherein the power domain includes one or more intelligent electronic devices (IEDs), and wherein the memory device stores processorexecutable instructions that, when executed, further configure the processor for generating a common record set of sequence of events (SOEs) for the process domain and the power domain and incorporating the SOEs arising from the IEDs in the common record set.

14. The controller of claim 12, wherein the first redundancy scheme corresponds to a Hot-Cold redundancy scheme, the second redundancy scheme corresponds to a Hot-Warm redundancy scheme, and the third redundancy scheme corresponds to a Hot-Hot redundancy scheme.

15. The controller of claim 12, wherein the first interface, the second interface, and the third interface each have different performance requirements and capabilities.

16. The controller of claim 12, further comprising at least one Active node and at least one Standby node each coupled to the first interface, the second interface, and the third interface, and wherein the at least one Active node is coupled to the at least one Standby node via a redundancy link.

17. The controller of claim 16, wherein the at least one Active node communicates with other nodes in the process domain for performing both process control and monitoring.

18. The controller of claim 16, wherein the at least one Active node scans and controls nodes on the LV network.

19. The controller of claim 16, wherein both the at least one Active node and the at least one Standby node run concurrently on the MV network.

* * * * *